United States Patent
Gopal et al.

(10) Patent No.: US 10,972,177 B2
(45) Date of Patent: Apr. 6, 2021

(54) EFFICIENT RESOURCE SHARING ACROSS DIVERSE NETWORKS

(71) Applicant: Hughes Network Systems, LLC, Germantown, MD (US)

(72) Inventors: Rajeev Gopal, North Potomac, MD (US); Nassir BenAmmar, Rockville, MD (US); Channasandra Ravishankar, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 51 days.

(21) Appl. No.: 16/281,072

(22) Filed: Feb. 20, 2019

(65) Prior Publication Data

US 2019/0260463 A1      Aug. 22, 2019

Related U.S. Application Data

(60) Provisional application No. 62/633,204, filed on Feb. 21, 2018.

(51) Int. Cl.
*H04B 7/185* (2006.01)
*H04W 72/04* (2009.01)
*H04W 88/16* (2009.01)
*H04B 7/19* (2006.01)

(52) U.S. Cl.
CPC ..... *H04B 7/18513* (2013.01); *H04B 7/18515* (2013.01); *H04B 7/18521* (2013.01); *H04B 7/18563* (2013.01); *H04W 72/0453* (2013.01); *H04W 88/16* (2013.01); *H04B 7/19* (2013.01)

(58) Field of Classification Search
None
See application file for complete search history.

(56) References Cited

U.S. PATENT DOCUMENTS

| 6,084,865 | A | * | 7/2000 | Dent | H04W 88/06 |
| | | | | | 370/321 |
| 6,163,302 | A | * | 12/2000 | Bjorkengren | H01Q 1/243 |
| | | | | | 343/702 |
| 6,975,582 | B1 | * | 12/2005 | Karabinis | H04B 7/18563 |
| | | | | | 370/204 |

(Continued)

FOREIGN PATENT DOCUMENTS

WO     2007120409 A2    10/2007

OTHER PUBLICATIONS

Invitation to Pay Additional Fees and Annex Communication Relating to the Results of the Partial International Search in PCT/US2019/018846 dated May 17, 2019.

*Primary Examiner* — Bunjob Jaroenchonwanit
(74) *Attorney, Agent, or Firm* — Bejin Bieneman PLC

(57) ABSTRACT

An orchestrator server and a terminal are disclosed. The server can include a computer that executes instructions which include, to: instruct a first terminal to communicate wirelessly via a carrier frequency using a first long-range wireless communication (LRWC) mode; determine that, relative to the first terminal, a subtended angle between a satellite and a cellular node is less than an alignment threshold; and based on the determination, transmit a command to the first terminal to communicate wirelessly via the carrier frequency using a second LRWC mode, wherein the first LRWC mode is different that the second LRWC mode.

18 Claims, 16 Drawing Sheets

(56) References Cited

U.S. PATENT DOCUMENTS

| | | | |
|---|---|---|---|
| 6,985,931 B2* | 1/2006 | Dowling | G06Q 20/04 370/401 |
| 7,809,379 B2* | 10/2010 | Kim | H04W 48/18 455/456.3 |
| 2001/0032268 A1* | 10/2001 | Brown | G05B 19/408 709/230 |
| 2003/0054814 A1 | 3/2003 | Karabinis et al. | |
| 2003/0134648 A1* | 7/2003 | Reed | H04W 4/029 455/456.1 |
| 2004/0218609 A1* | 11/2004 | Foster | H04L 45/22 370/401 |
| 2005/0174298 A1* | 8/2005 | Chiang | H01Q 19/26 343/834 |
| 2005/0181785 A1* | 8/2005 | Chen | H04W 48/18 455/428 |
| 2005/0239403 A1 | 10/2005 | Karabinis | |
| 2009/0316621 A1* | 12/2009 | Lane | H04W 56/0005 370/326 |
| 2012/0021700 A1* | 1/2012 | Beghini | H04W 76/10 455/90.2 |
| 2013/0315112 A1* | 11/2013 | Gormley | H04W 16/14 370/280 |
| 2013/0324165 A1* | 12/2013 | Fujiwara | H04W 4/029 455/457 |
| 2015/0341108 A1* | 11/2015 | Anderson | H04B 7/1851 455/428 |
| 2016/0041253 A1* | 2/2016 | Reimann | G01S 5/0247 342/361 |
| 2016/0345189 A1* | 11/2016 | Miyagawa | H04B 7/18517 |
| 2017/0245185 A1* | 8/2017 | Chuberre | H04L 43/0882 |
| 2019/0090141 A1* | 3/2019 | Fujii | H04W 84/06 |
| 2019/0260463 A1* | 8/2019 | Gopal | H04B 7/18513 |
| 2019/0288951 A1* | 9/2019 | Slater | H04B 7/18513 |
| 2020/0015187 A1* | 1/2020 | Hassan | H04W 64/003 |
| 2020/0053536 A1* | 2/2020 | Huang | H04B 5/0062 |

\* cited by examiner

US 10,972,177 B2

EFFICIENT RESOURCE SHARING ACROSS DIVERSE NETWORKS

CROSS-REFERENCE TO RELATED APPLICATIONS

This patent application claims priority to and all the benefits of U.S. Provisional Patent Application No. 62/633,204 filed on Feb. 21, 2018, which is herein incorporated by reference in its entirety.

BACKGROUND

Cellular communication frequencies can vary within a range of 0.8 to 2.4 GigaHertz (GHz). Satellite communication frequencies can vary within a range of 4 to 30 GHz. In the United States, as well as abroad, the local government may regulate radio frequency (RF) operations to mitigate RF interference—e.g., dedicating each of a plurality of frequency ranges (bands) to a specific purpose or type of transceiver. Non-limiting bands include a cellular band, a satellite band, a military band, etc.

DETAILED DESCRIPTION

Figure 1:
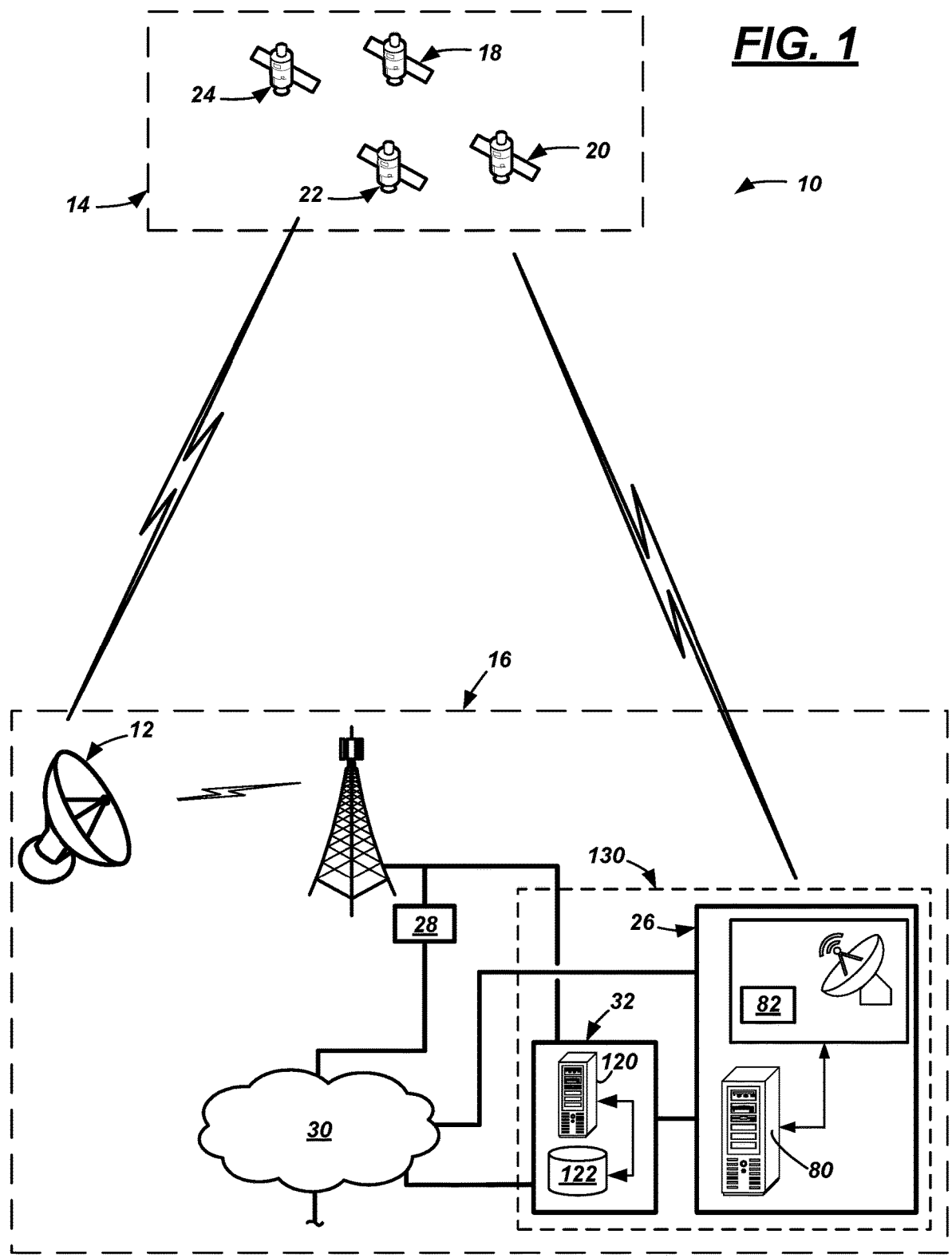
FIG. 1 is a schematic diagram illustrating an exemplary telecommunication system.

According to an illustrative example, a telecommunications systems is described that includes a terminal, comprising: a processor; memory, coupled to the processor, storing instructions executable by the processor; and an antenna, wherein the instructions comprise, to: using a first long-range wireless communication (LRWC) mode, receive or transmit first wireless data using a carrier frequency; receive a command to use a second LRWC mode; and using the second LRWC, receive or transmit second wireless data using the same carrier frequency, wherein the first LRWC mode is different than the second LRWC mode.

According to the at least one example set forth above, the command is received from an orchestrator server.

According to the at least one example set forth above, the instructions further comprise to control a directionality of the antenna when switching between the first and second LRWC modes.

According to the at least one example set forth above, the terminal further comprises a software stack that enables the terminal to operate as a software defined radio (SDR).

According to the at least one example set forth above, the instructions further comprise to: use a first set of dynamic parameters in the first LRWC mode; and use a second set of dynamic parameters in the second LRWC mode, wherein the first set comprises at least some values that are different from the second set.

According to the at least one example set forth above, the first LRWC mode is a satellite mode, wherein the second LRWC mode is a cellular mode.

According to the at least one example set forth above, the system further comprises an orchestrator server that commands the terminal and a plurality of other terminals to selectively switch between the first and second LRWC modes.

According to another illustrative example, a system comprises: an orchestrator server, comprising: a computer communicatively coupled to a satellite gateway and a cellular access network, the computer comprising: a processor; and memory, coupled to the processor, storing instructions executable by the processor, the instructions comprising, to: instruct a first terminal to communicate wirelessly via a carrier frequency using a first long-range wireless communication (LRWC) mode; determine that, relative to the first terminal, a subtended angle between a satellite and a cellular node is less than an alignment threshold; and based on the determination, transmit a command to the first terminal to communicate wirelessly via the carrier frequency using a second LRWC mode, wherein the first LRWC mode is different that the second LRWC mode.

According to the at least one example set forth above, the alignment threshold is two degrees.

According to the at least one example set forth above, the command further comprises a second set of dynamic parameters, for operation of the first terminal in the second LRWC mode, wherein the second set is different than a first set of dynamic parameters being used by the first terminal at a time the command is transmitted.

According to the at least one example set forth above, the first LRWC mode is a satellite mode, wherein the second LRWC mode is a cellular mode.

According to the at least one example set forth above, wherein the system further comprises the first terminal, wherein the first terminal is programmed to transmit or receive first wireless data via the first LRWC mode using the carrier frequency and also to transmit or receive second wireless data via the second LRWC mode using the carrier frequency.

According to the at least one example set forth above, the instructions further comprise: repeating the instructions to instruct, determine, and transmit for a plurality of terminals, wherein the plurality of terminals includes the first terminal.

According to the at least one example set forth above, the instructions further comprise: transmitting the commands to each of the plurality of terminals based on availability of a plurality of system resources, wherein the plurality of system resources includes one or more satellites, one or more cellular nodes of the cellular access network, and the satellite gateway.

According to the at least one example set forth above, the instructions further comprise: commanding at least some of the plurality of terminals to switch between the first and second LRWC modes based on current wireless traffic data, wireless traffic trend data, or both.

According to the at least one example set forth above, the instructions further comprise: negotiating with a second orchestrator server to exchange system resources using a secure transaction technique.

According to another illustrative example, a method of controlling terminal communication, comprises: instructing a first terminal to communicate wirelessly via a carrier frequency using a first long-range wireless communication (LRWC) mode; determining that, relative to the first terminal, a subtended angle between a satellite and a cellular node is less than an alignment threshold; and based on the determination, transmitting a command to the first terminal to communicate wirelessly via the carrier frequency using a second LRWC mode, wherein the first LRWC mode is different that the second LRWC mode.

According to the at least one example set forth above, the alignment threshold is two degrees.

According to the at least one example set forth above, the method further comprises: repeating the instructing, determining, and transmitting for a plurality of terminals, wherein the plurality of terminals includes the first terminal; and transmitting the commands to each of the plurality of terminals based on availability of a plurality of system resources, wherein the plurality of system resources includes one or more satellites, one or more cellular nodes of the cellular access network, and the satellite gateway.

According to another illustrative example, a system is described that comprises a first gateway, comprising: a computer communicatively coupled to an orchestrator server, the computer programmed to execute a plurality of instructions, the plurality of instructions comprising to: determine a need for wireless communication resources, wherein the resources comprise a communication frequency and a time duration which may be shared between the first gateway and a second gateway; provide a request for the resources to the second gateway; and receive a confirmation from the second gateway that it will permit use of the resources by the first gateway, wherein the first gateway is one of a satellite gateway or a cellular gateway and the second gateway is the other (i.e., either the first gateway is the satellite gateway and the second gateway is the cellular gateway, or the first gateway is the cellular gateway and the second gateway is the satellite gateway).

Any of the instruction examples set forth above may be combined with one another according to any suitable combination.

Any of the method examples set forth above may be combined with one another according to any suitable combination.

According to at least one example, a computer is disclosed that is programmed to execute any combination of the method examples set forth above.

According to at least one example, a computer program product is disclosed that includes a computer readable medium storing instructions executable by a computer processor, wherein the instructions include any combination of the instruction examples set forth above.

According to at least one example, a computer program product is disclosed that includes a computer readable medium that stores instructions executable by a computer processor, wherein the instructions include any combination of the method examples set forth above.

With reference to the figures wherein like reference numerals denote identical or like features or elements, a telecommunication system 10 is shown in FIG. 1 that includes a multi-mode terminal 12 that communicates (wirelessly transmits and/or receives) by selectively operating in at least one of two different modes—e.g., such as selectively switching back and forth between a first long-range wireless communication (LRWC) mode (e.g., a satellite mode) and a second LRWC mode (e.g., a cellular mode). More particularly, the terminal 12 may be programmed to communicate in the first and second LRWC modes using a common frequency (e.g., a common carrier frequency). As will be described more below, using system 10, terminal 12 wirelessly may communicate cellular data at higher data rates and/or may be enabled to communicate data over a variety of wireless communication links (or simply referred to a 'wireless links')—e.g., communicating over a second wireless link (e.g., a cellular link) when network congestion exceeds a threshold over a first wireless link (e.g., a satellite link), or vice-versa. As will be described more below, terminal 12 may be instructed when to switch between the first and second wireless communication modes by one or more remotely-located computing devices.

Below, an illustrative example of system 10 is described. Thereafter, illustrative examples of computer-executable processes are described, wherein the processes use elements of the system 10. It should be appreciated that the context of the description below pertains to fifth generation (5G) telecommunication, wherein 5G networks are expected to require significantly more radio frequency (RF) spectrum than fourth generation (4G) and other existing technologies. For example, satellite communication currently utilizes bands up to 30 GHz and—in a 5G context, may be expanding to even higher radio frequency bands. For these higher bands, antenna directivity is more relevant, and as disclosed below, directional links may be used to reduce path and propagation losses.

Telecommunication System

FIG. 1 illustrates the telecommunication system 10 comprising at least one orbiting device 14 and a plurality of terrestrial devices 16. In the illustrated system 10, the at least one orbiting device 14 comprises a constellation of satellites 18, 20, 22, 24. Further, in the illustrated system 10, the plurality of terrestrial devices 16 comprise: one or more terminals 12 (only one is shown for illustration purposes), at least one satellite gateway 26 (again, only one is shown for illustration purposes) that can communicate with the terminal 12 via at least one of satellites 18-24, at least one cellular access network (AN) 28 (only one is shown for sake of illustration purposes) that can communicate with the terminal 12, a core network (CN) 30 that can be communicatively coupled to the satellite gateway 26, and the cellular gateway 28, and an orchestrator server 32. In FIG. 1, the server 32 may be used to, among other things, determine when terminals 12 should switch between one of a plurality of LRWC modes; server 32 is shown communicatively coupled between the satellite gateway 26 and the core network 30;

however, as will be apparent from the description below, this communicative coupling arrangement is merely an example.

Orbiting device 14 may refer to any electro-mechanical machine having orbital motion above a threshold altitude—i.e., orbital motion refers to having gravitational-influenced motion around the Earth. Non-limiting examples of threshold altitudes include altitudes above sea level of: 1000 kilometers (km), 2000 km, 4000 km, 10,000 km, 20,000 km, 35,000 km, and the like. Further, by way of example, the orbiting device 14 may travel in a Geo-Synchronous-earth Orbit (GSO) or a Non-Geo-Synchronous-earth Orbit (NGSO). Further, GSO orbiting devices may include those devices traveling in Geostationary Equatorial Orbits (GEOs); however, this is not required. Still further, orbiting devices 14 can include those traveling in a Low Earth Orbit (LEO), a Medium Earth Orbit (MEO), a High Earth Orbit (HEO), or any other suitable orbit above, below, or therebetween. According to one example, orbiting device 14 may include pseudo-satellites (High-Altitude Pseudo-Satellites), aircraft, blimps, and balloons.

In at least one example, each of satellites 18-24 may be identical; therefore, only one will be described. Satellite 18 may comprise any suitable arrangement of electronics, including but not limited to, power electronics, onboard computer(s), antenna(s), transmitter(s), receiver(s), and the like—interconnected to provide power and communication to its various components and sub-components. In at least one example, the satellite 18 comprises a so-called bent pipe architecture—e.g., functioning to relay information between terminal 12 and satellite gateways 26. According to one example, satellite 18 is located within a GEO. Thus, as will be explained in greater detail below, a terrestrial observer would perceive satellite 18 to be in a substantially fixed position in the sky. According to another example, satellite 18 is located within a GSO (but not a GEO). And according to yet another example, satellite 18 is located within a NGSO.

Turning to the terrestrial devices 16 (and more particularly, terminal 12), as used herein, a terminal is an electronic device which is configured to communicate via a plurality of different long-range wireless communication (LRWC) modes. As used herein, a long-range wireless communication (LRWC) mode refers to a node-to-node wireless link larger than 800 meters. As discussed above, two non-limiting examples of LRWC modes include a cellular mode and a satellite mode; however, other examples exist.

Figure 2:
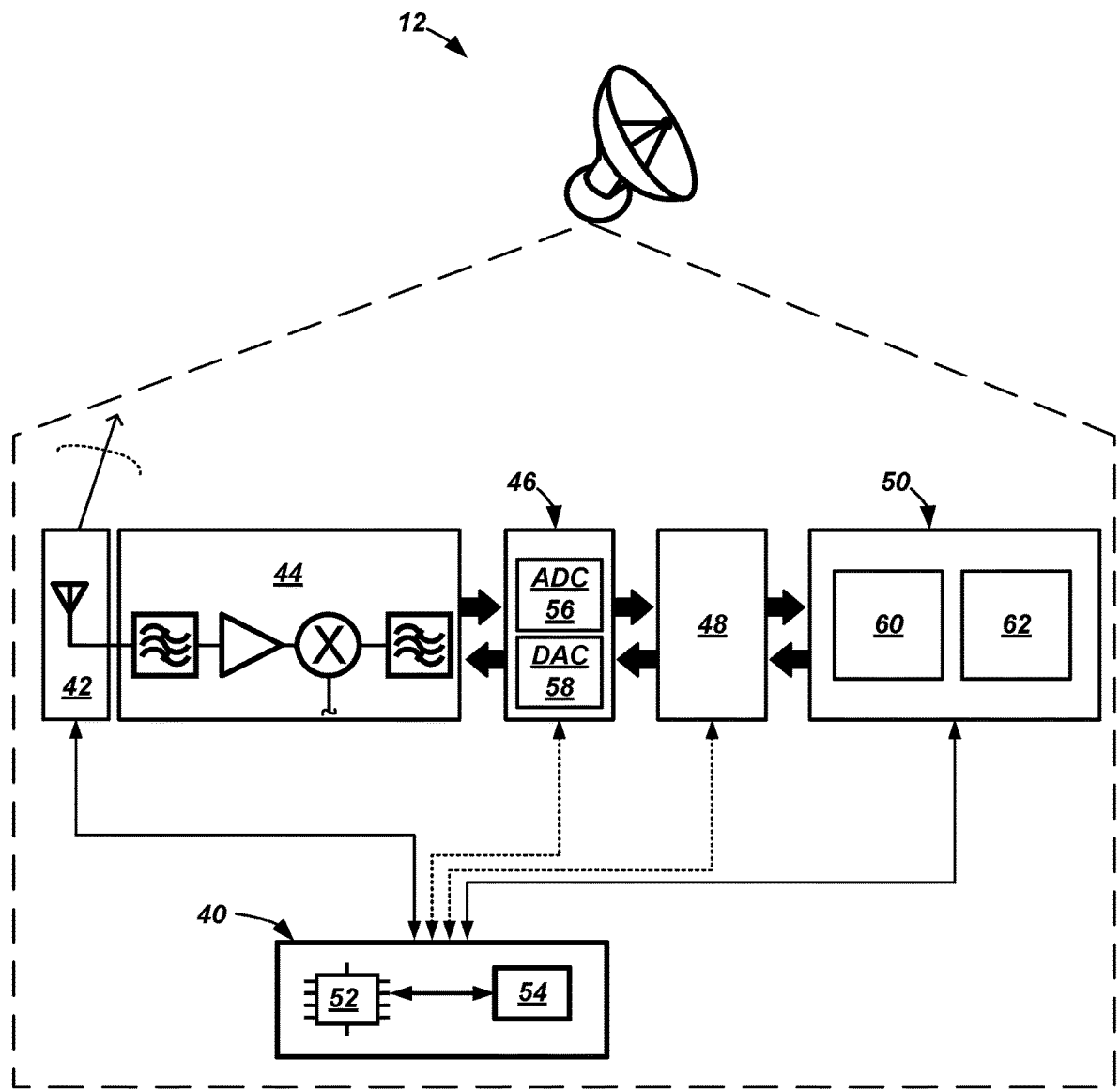
FIG. 2 is a schematic diagram of a terminal of the system shown in FIG. 1.

FIG. 2 illustrates that terminal 12 may comprise a computer 40, an antenna 42, a radio frequency (RF) front end 44, a signal converter 46, a channelizer and sampling rate converter 48, and a baseband processing unit 50. Each will be discussed in turn below. Non-limiting examples of terminal 12 include a user terminal and a backhaul terminal. For example, a backhaul terminal is a terminal that may connect to a terrestrial tower (e.g., cellular)—e.g., not having connectivity to a core network. According to one example, via such a backhaul terminal (and also via a satellite and satellite gateway), a terrestrial tower may be connected to the core network.

Computer 40 of terminal 12 comprises at least one processor 52 (only one is shown for purposes of illustration) and memory 54. Processor 52 may be any arrangement of electronic components capable of carrying out the methods described herein. Non-limiting examples of processor 52 include a microprocessor, a microcontroller or controller, an application specific integrated circuit (ASIC), etc.—just to name a few. In general, computer 40 may be programmed to execute (via the processor 52) digitally-stored instructions, which may be stored in memory 54, which enable the computer 40, among other things, to: steer a beam of the directional antenna; based on a direction of the beam, and using a first LRWC mode, receive or transmit first wireless data using a carrier frequency; and using a second LRWC mode, receive or transmit second wireless data, via a second wireless link, using the same carrier frequency, wherein the first LRWC mode is different than the second LRWC mode. This is merely one exemplary set of instructions; other instructions exist which may be executed in addition to and/or instead of these exemplary instructions—including those instructions which are described below and shown by way of example in the flow diagrams.

Memory 54 may include any non-transitory computer usable or readable medium, which may include one or more storage devices or articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 54 may store one or more computer program products which may be embodied as software, firmware, or other programming instructions executable by the processor 52—including but not limited to the instruction examples set forth above.

Antenna 42 may comprise any suitable hardware and/or software (or firmware and/or the like) adapted to receive radio wave signals for data processing and/or to transmit radio wave signals received from signal-processing components internal to the terminal 12. Antenna 42 may operate in an omnidirectional mode or a directional mode. And in at least one example, antenna 42 operates in both omnidirectional and directional modes. As used herein, a directional mode refers to: (a) when transmitting, focusing radio wave density in a predetermined direction via a beam (e.g., a beam can be also referred to as a 'lobe'); and (b) when receiving, focusing radio wave reception in a predetermined direction via a beam. As used herein, an omnidirectional mode refers to transmitting or receiving without regard to direction (i.e., not in a directional mode); thus, to cite a couple examples, operating in an omnidirectional mode can include transmitting equally in all directions and/or receiving equally in all directions. In at least one example, antenna 42 comprises a phased-array antenna—e.g., comprising a plurality of antenna elements, wherein each element is typically coupled to a phase-shift driver (not shown) so that each antenna element can be selectively controlled to control a direction of the antenna's beam. This is merely an example; other directional antenna examples exist. In at least one example, antenna 42 is adapted to operate within a frequency range of 1 to 300 GHz (e.g., including L band, S band, Ku band, Ka band, and the Extremely High Frequency (EHF) band).

RF front end 44 may include any suitable arrangement of RF filters, RF amplifiers, mixer(s), local oscillator(s), and/or intermediate filters. Front end 44 will not be described in great detail here, as these elements and their arrangements are known in the art.

Signal converter 46 may include any suitable conversion hardware and/or software to convert analog signals to digital signals and vice-versa. FIG. 2 illustrates that the converter 46 comprises, for radio signals received via antenna 42, an analog-to-digital converter (ADC) 56; and FIG. 2 illustrates that the converter 46 comprises, for radio signals being transmitted from antenna 42, a digital-to-analog converter (DAC) 58. Any suitable ADCs and DACs may be used including those implemented via electronic circuit components, via software, or a combination thereof.

Channelizer and sampling rate converter 48 may include suitable conversion hardware and/or software for channelization and sampling rate conversion of incoming or outgoing communications. For example, for receiving wireless data (via ADC 56), converter 48, among other things, may determine a center frequency and perform additional filtering, frequency-conversion, down-sampling, and data packet extraction. And for example, for transmitting wireless data, converter 48, among other things, may perform a reverse operation (using packet data to be transmitted), and converter 48 may deliver this processed data to DAC 58.

Baseband processing unit (BPU) 50 also may include any suitable electronic hardware 60 and/or a software 62 that is configured to manage multiple radio functions (i.e., those which require antenna 42). Non-limiting examples of hardware 60 include any suitable combination and arrangement of field-programmable gate arrays (FPGAs), discrete signal processing (DSP) units, application specific integrated circuits (ASICs), and the like. Non-limiting examples of software 62 utilize and or comprise any suitable combination of algorithms, middleware (i.e., software that bridges an operating system (OS) and application software and/or databases), common object request broker architecture (CORBA), virtual radio machines, or the like.

According to at least one example, using the preceding components, the terminal 12 may operate as a so-called Software Defined Radio (SDR). SDR systems replace at least some traditional radio components with tailored software (e.g., at least a portion of signal converter 46, channelizer and sampling rate converter 48, and/or BPU 50 may be implemented in software as part of the SDR). In this manner, terminal 12 may serve as a dynamic transmitter and/or a dynamic receiver—capable of using components 40-50 to wirelessly communicate via both a cellular protocol and a satellite protocol via a common predetermined carrier frequency.

FIG. 2 further illustrates that computer 40 may be communicatively coupled to antenna 42 so that processor 52 may control the antenna mode (as well as antenna directionality, as appropriate) and that computer 40 may be communicatively coupled to BPU 50 so that processor 52 may control a plurality of parameters of the BPU 50 to dynamically utilize the terminal 12 via different LRWC modes, as explained more below (following a discussion of the terminal's software stack). FIG. 2 illustrates that computer 40 (optionally) may be communicatively coupled to the signal converter 46 and/or the channelizer and sampling rate converter 48 as well—e.g., to control computer-implemented operations thereof.

Figure 3:
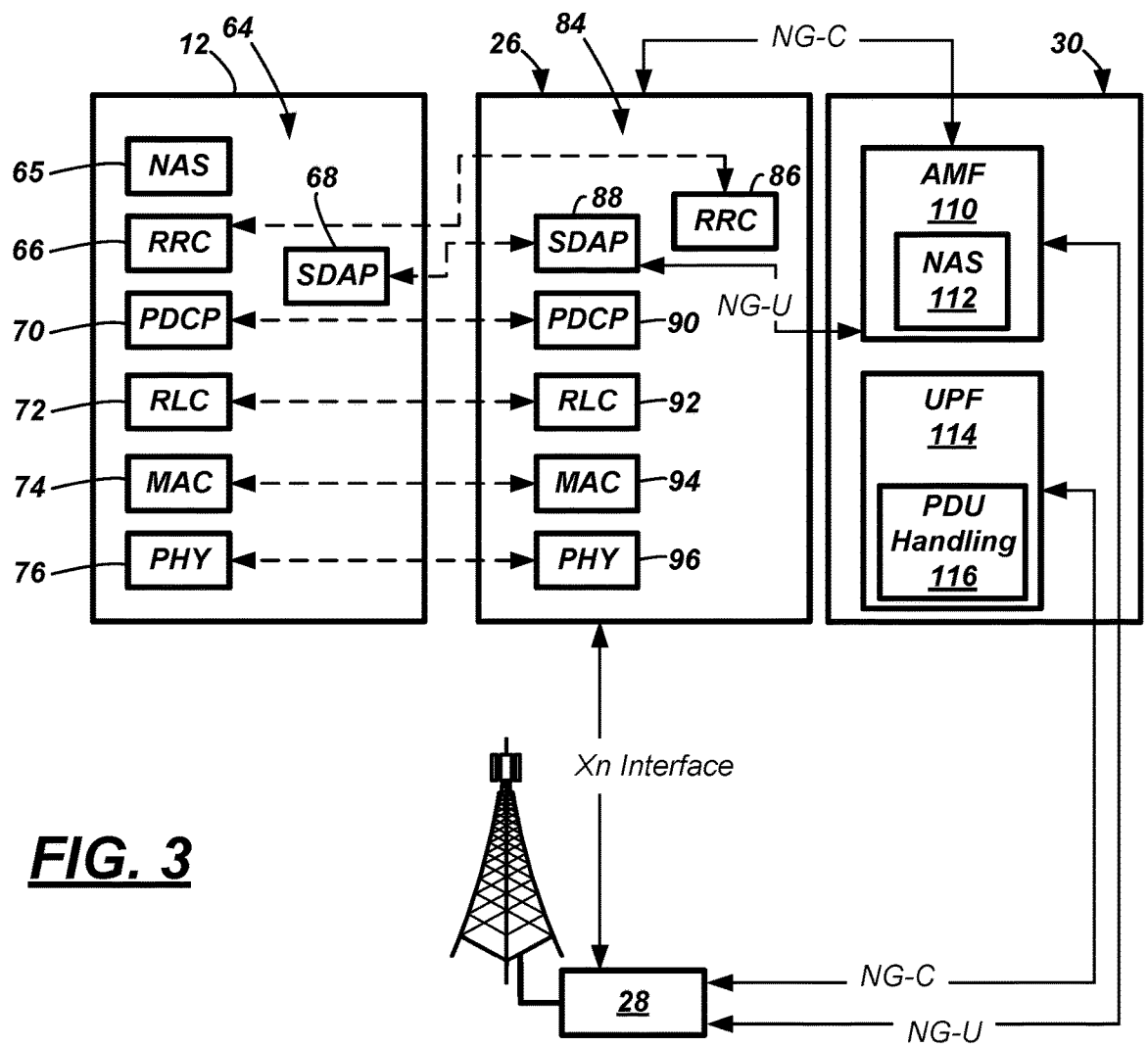
FIG. 3 is a schematic diagram of a portion of the system shown in FIG. 1.

Turning to FIG. 3, an example software stack 64 of terminal 12 is shown (e.g., according to the Open Systems Interconnection (OSI) model). For example, stack 64 may comprise a Non-Access Stratum layer 65, a Radio Resource Control (RRC) layer 66, a Service Data Adaption Protocol (SDAP) layer 68, a Packet Data Convergence Protocol (PDCP) layer 70, a Radio Link Control (RLC) layer 72, a Media Access Control (MAC) layer 74, and a Physical (PHY) layer 76. According to at least one example, in a fifth generation (5G) implementation, a NAS layer 65 may comprise a functional layer in cellular telecom protocol stacks to enable communication between the core network 30 and the terminal 12. According to at least one example, in a 5G implementation, the RRC layer 66 includes a cellular communication protocol defined by the $3^{rd}$ Generation Partnership Project (3GPP). According to at least one example, in a 5G implementation, the SDAP layer 68 may function to map between a quality of service (QoS) flow and a data radio bearer. According to at least one example, in a 5G implementation, the PDCP layer 70 may function to: transfer data between a user plane and control plane, maintain PDCP sequence numbers, perform header compression and decompression, cipher and decipher, etc. According to at least one example, in a 5G implementation, the RLC layer 72 may function to: transfer upper layer protocol data units (PDUs), sequence numbering, re-establish RLC, etc. According to at least one example, in a 5G implementation, the MAC layer 74 may function to: transfer upper layer protocol data units (PDUs), sequence numbering, re-establish RLC, etc. According to at least one example, in a 5G implementation, the PHY layer 76 may comprise any hardware, electronic circuitry, etc. suitable to implement the functions of the terminal 12, as described herein.

In order to dynamically utilize the terminal 12 via different LRWC modes, one or more parameters of at least some of the layers in the software stack 64 of terminal 12 may be dynamically interchanged (e.g., for these dynamic parameters: a first set of values for operation in a cellular mode and a second set of values for operation in a satellite mode). A set of dynamic parameters may include, among other examples, an RRC timer parameter. For example, in a cellular mode, the RRC timer parameter may have a value of 100 milliseconds (ms), whereas in a satellite mode, the RRC timer parameter may have a value of 1000 ms (e.g., for a GEO satellite system). And/or for example, an RLC layer timer t_pollRetransmit may be as little as 50 ms, whereas in a satellite mode, the RLC layer timer t_pollRetransmit may be as little as 500 ms. As will be explained more below, these and other dynamic parameters (and respective values associated therewith) may be broadcasted to the terminal 12 at a time the terminal 12 connects to a satellite gateway 26 and/or cellular gateway 28. Of course, other examples also exist (e.g., any suitable values instead could be stored in memory 54 of terminal 12). Using these dynamic parameters, terminal 12 may seamlessly switch between the cellular mode and the satellite mode.

As shown in FIG. 1, satellite gateway 26 may comprise a computer 80 and a satellite transceiver 82. Computer 80 may comprise any suitable components (not shown) including one or more processors, one or more memory devices, or the like—e.g., similar to those described above, but of course configured and/or programmed to carry out instructions regarding satellite communications and intercommunications with the cellular access network 28, core network 30, and/or other various backend services. Transceiver 82 may comprise an antenna coupled to any suitable signal processing hardware and software configured to send and receive satellite data via satellites 18-24 (transceiver components not shown).

Figure 4:
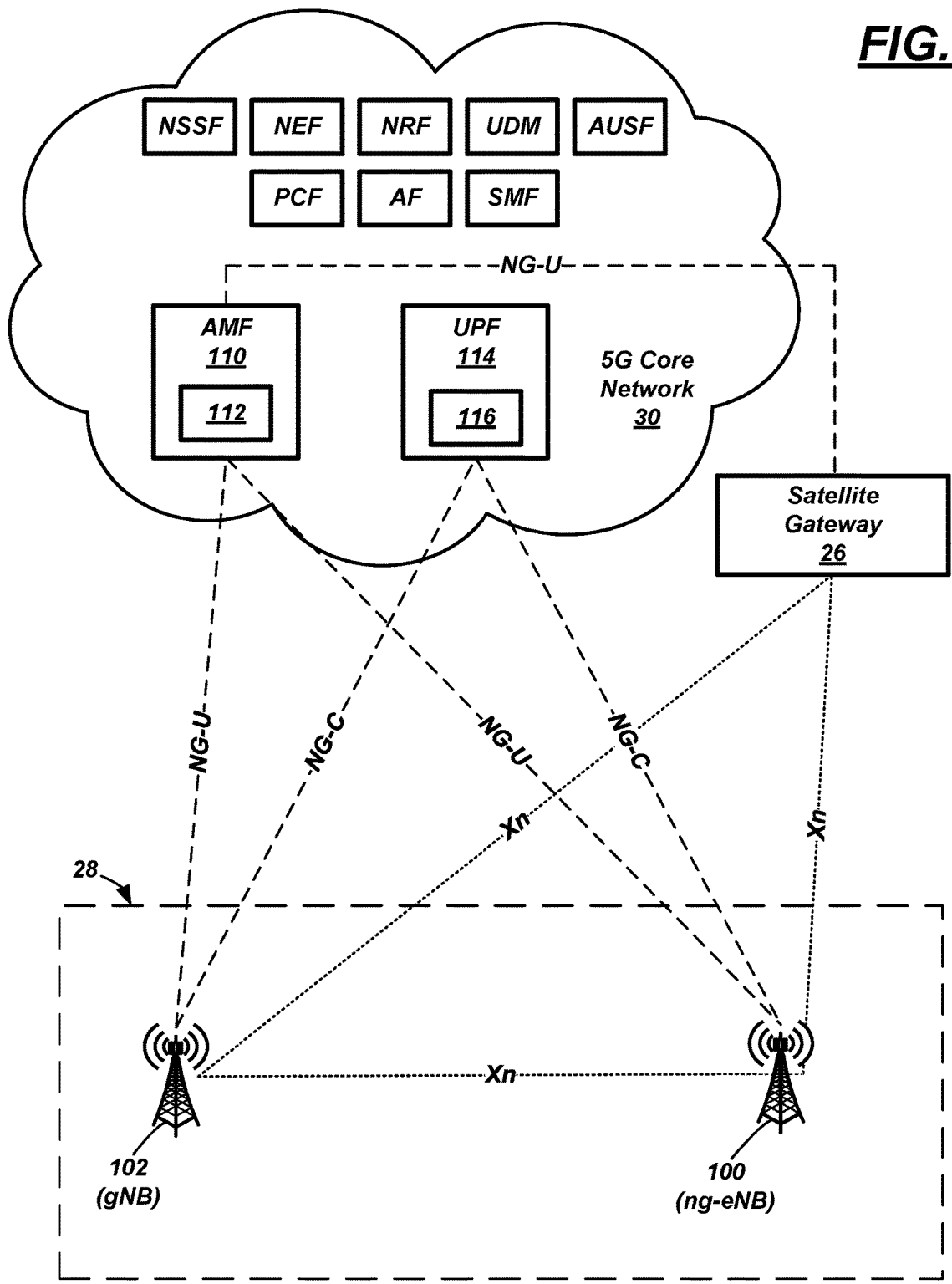
FIG. 4 is another schematic diagram of a portion of the system shown in FIG. 1.

FIG. 3 illustrates that satellite gateway 26 may comprise a software stack 84 that corresponds with the software stack 64 (of terminal 12). Among other layers, software stack 84 may comprise an RRC layer 86, an SDAP layer 88, a PDCP layer 90, an RLC layer 92, a MAC layer 94, and a PHY layer 96—which correspond with layers 66-76, respectively. As these layers may have similar functions except that they are implemented in satellite gateway 26, they will not be described in greater detail here. FIG. 4 illustrates that RRC layers 66, 86 may be communicatively coupled; SDAP layers 68, 88 may be communicatively coupled; PDCP layers 70, 90 may be communicatively coupled; RLC layers 72, 92 may be communicatively coupled; MAC layers 74, 94 may be communicatively coupled; and PHY layers 76, 96 may be communicatively coupled.

As shown in FIGS. 1 and 4, cellular access network (AN) 28 may comprise a 5G New Radio (NR) implementation. For example, AN 28 may comprise multiple cellular next generation eNodeB nodes (ng-eNB) 100 and multiple next generation NodeB nodes (gNB) 102 (one of each is shown only for purposes of illustration; of course, more of either may be used instead). Nodes 100, 102 may communicate with one another via a control interface (Xn) link, and via the same type of link, nodes 100, 102 may communicate with satellite gateway 26. Further, nodes 100, 102 may communicate with the core network (CN) 30 via next generation user plane and next generation control plane links (NG-U link and NG-C link, respectively). Xn, NG-U, and NG-C links may be wired, wireless, or a combination thereof.

Core network (CN) 30—as shown in FIGS. 1, 3, and 4—may comprise any suitable telecommunication network facilitating communication between network or sub-networks. In the illustrations, it is shown by way of example to be a 5G core network; however, this is merely an example. As best shown in FIG. 4, CN 30 may comprise a Core Access and Mobility Management Function (AMF) 110 (comprising NAS layer 112), a User Plane Function (UPF) 114 (comprising Protocol Data Unit (PDU) Handling 116), a Network Slice Selection Function (NSSF), a Network Exposure Function (NEF), a Network Repository Function (NRF), a Unified Data Management (UDM), an Authentication Server Function (AUSF), a Policy Control Function (PCF), an Application Function (AF), and a Session Management Function (SMF), among other things.

AMF 110 may support termination of NAS signaling, NAS ciphering and integrity, registration management, connection management, mobility management, access authentication and authorization, security context management, and the like. As shown in FIG. 3, AMF 110 may communicate with satellite gateway 26 via a NG-C link, with SDAP 88 (of gateway 26) via a NG-U link, and with cellular AN 28 via a NG-U link.

UPF 114 may support packet routing and forwarding, packet inspection, and quality of service (QoS) handling. Further, UPF 114 may act as an external PDU session point of interconnect to data networks (DNs) and may be an anchor point for intra- and inter-radio access technology (RAT) mobility. UPF 114 may communicate with cellular AN 28 via a NG-C link.

Figure 5:
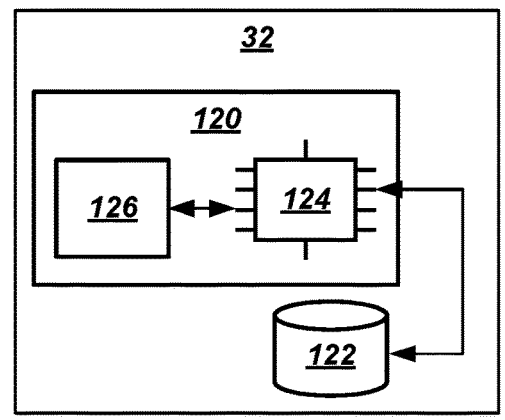
FIG. 5 is a schematic diagram of an orchestrator server.

Orchestrator server 32 is shown in at least FIGS. 1 and 5 and is configured to control switching of multiple terminals 12 between first and second LRWC modes using satellite gateways 26, cellular AN 28, other infrastructure or devices, or a combination thereof. According to one example, server 32 comprises a computer 120 and one or more databases 122. Computer 120 may comprise one or more processors 124 and memory 126. Processor(s) 124 and memory 126 may be similar to the processor and memory described above, except that memory 126 (and/or processor(s) 124) may store different instructions and these different instructions may be executable by processor(s) 124 (instead of by processor(s) 52). Databases 122 may store, among other things, information regarding multiple terminals (such as terminal 12), satellites 18, satellite gateways 26, cellular AN 28, or the like. Further, databases 122 may store usage information—e.g., indicating data traffic patterns over cellular communication links, as well as data traffic patterns over satellite communication links. Processor(s) 124 may parse databases 122 and memory 126 and utilize any such information to carry out any portion of the methods described herein.

According to one example, server 32 may facilitate—e.g., via the satellite gateway 26 and/or cellular gateway 28—how and when terminal 12 switches between the different long-range wireless communication (LRWC) modes (e.g., between cellular and satellite modes). Server 32 may be used to increase spectrum sharing, thereby utilizing unused resources across a diversity of platforms and telecommunication systems; e.g., using real-time analysis of spatial and temporal traffic demands, geometrical considerations regarding line-of-sight signal propagation based on radio path characteristics, historical resource usage information, regulatory constraints, and trajectory models of mobile platforms. Accordingly, server 32 may instruct terminals 12 to switch LRWC modes, as will be described more below. Additional examples of server 32 will be described more below. In at least one example, server 32 forms part of satellite gateway 26 (e.g., FIG. 1 illustrates an orchestrator system 130 that comprises satellite gateway 26 and orchestrator server 32).

According to one example, server 32 may be programmed and/or configured to maintain awareness of resources used by diverse systems; e.g., wherein each system is capable of tracking locations and mobility of its platforms, the beams and/or coverage data, and respective unused frequency resources (including time durations).

Figure 6:
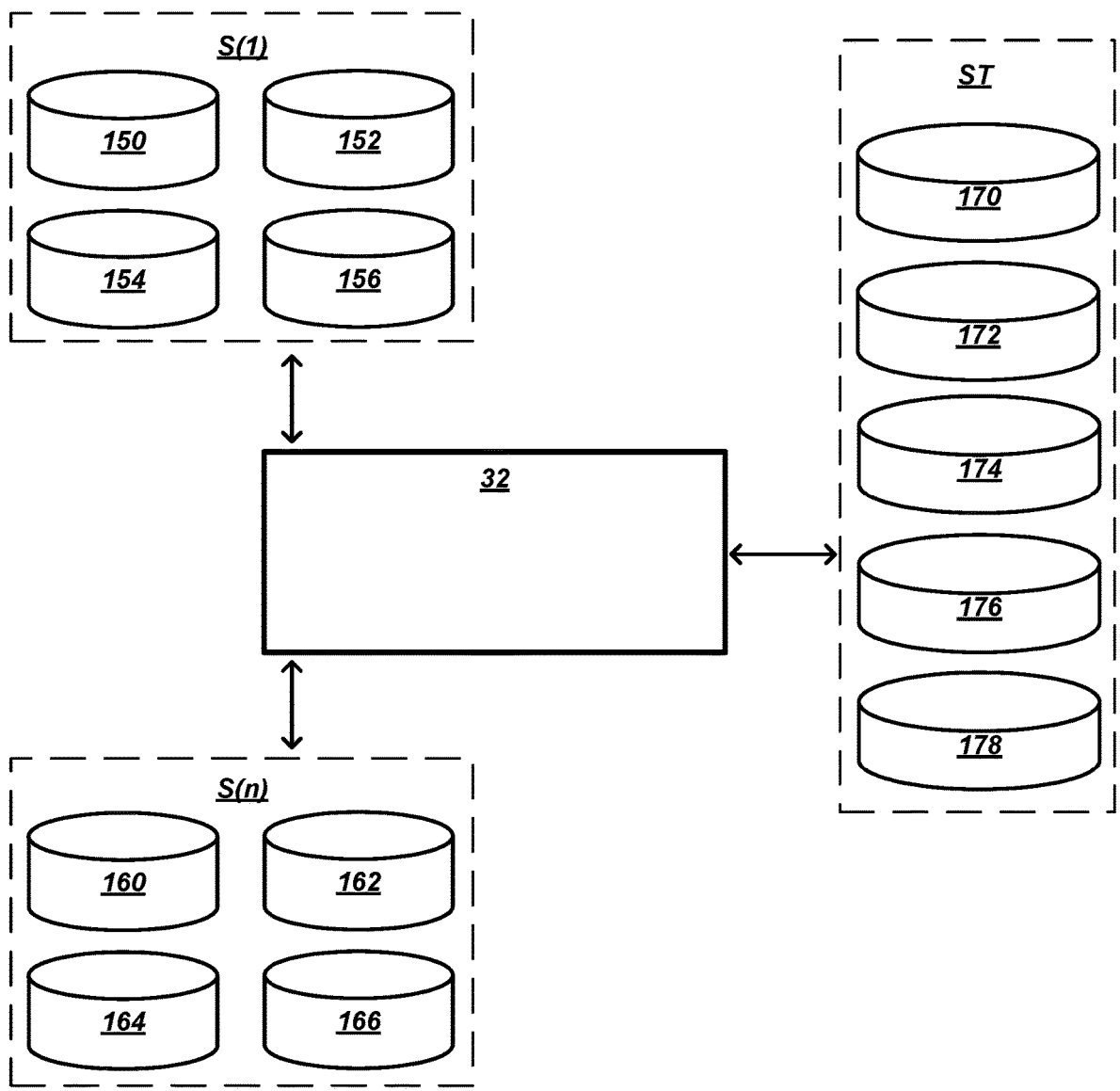
FIG. 6 is a schematic diagram of a spectrum sharing approach across multiple systems.

FIG. 6 illustrates a schematic diagram of an illustrative environment of a spectrum sharing approach, wherein server 32 is positioned centrally with respect to a first set S(1) of repeatedly-updated information, another set S(n) of repeatedly-updated information, and a set of static information (ST). [It is contemplated that any suitable quantity of sets of repeatedly-updated information may be used—e.g., while not all shown here, S(1), S(2), S(3), . . . , S(n).]

Set S(1) may comprise data from a first system such as a satellite network (e.g., received via satellite gateway 26). Non-limiting data types may include unused resources data 150, resource demand data 152, platform location data 154 (of terminals 12, satellite-only terminals, etc.), and current traffic data 156.

Set S(2) may comprise data from a second system such as a cellular network (e.g., received via cellular access network 28—e.g., via one or more nodes 100, 102 or the like). Non-limiting data types may include unused resources data 160, resource demand data 162, platform location data 164 (of terminals 12, cellular-only terminals, etc.), and current traffic data 166.

Set ST may comprise data pertinent to either the satellite network or the cellular network, but which does not typically change regularly or during the course of a day. Non-limiting data types may include International Telecommunication Union (ITU) regulation data 170, host nation agreement data 172, antenna configuration data 174 (e.g., of terminal 12), gateway antenna configuration data 176 (e.g., transceiver 24), and service plan data 178.

Figure 7:
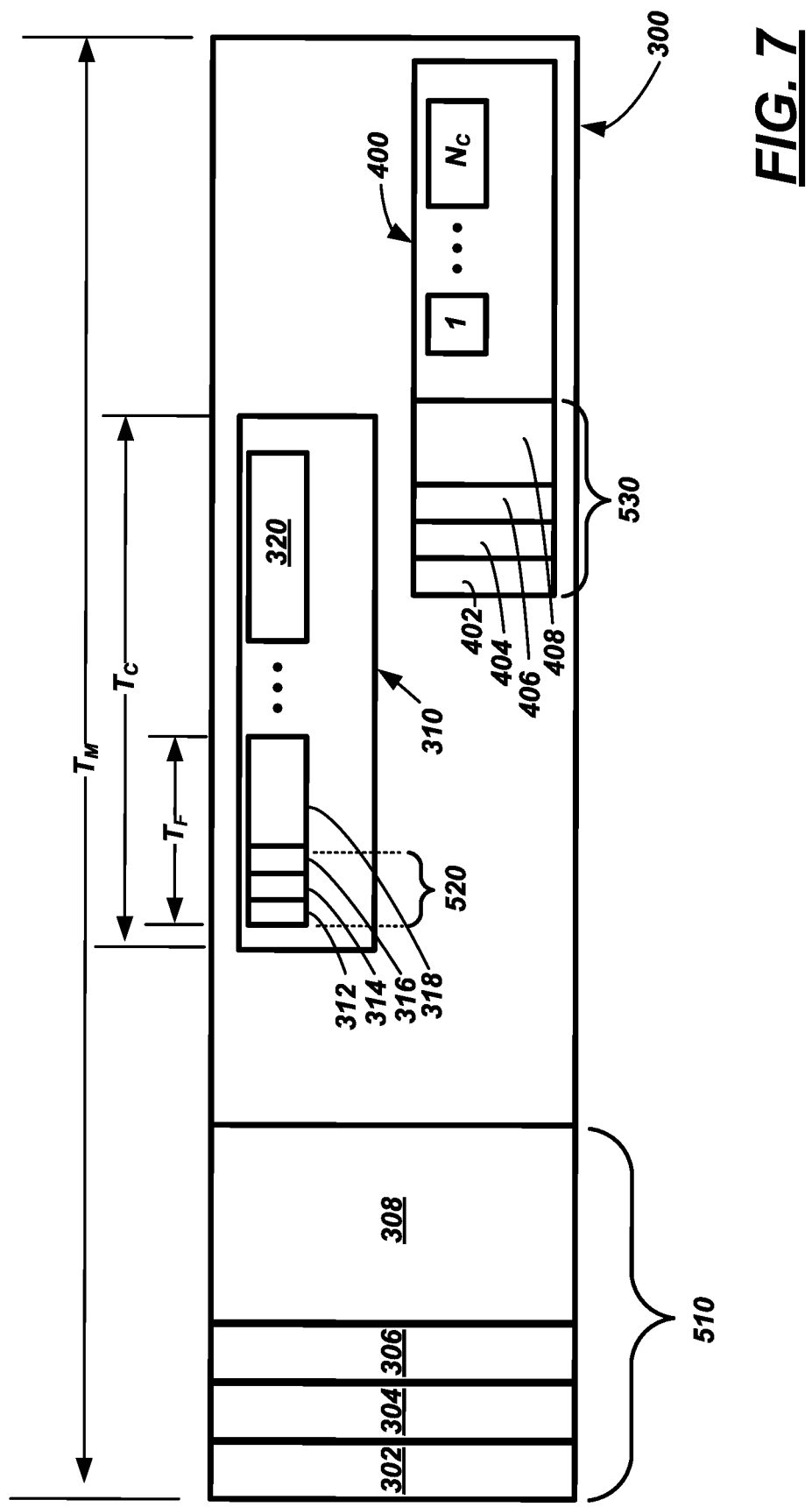
FIG. 7 is a schematic diagram of a multi-tiered resource orchestration.

FIG. 7 illustrates a multi-tiered resource orchestration—e.g., usable by the orchestrator server 32, the cellular gateway 28 (e.g., cellular nodes 100, 102), and/or the satellite gateway 26. In this manner, the server 32 may receive information regarding cellular resources (e.g., from cellular gateway 28), determine whether to communicate with the satellite gateway 26 (e.g., to advise regarding such sharable resources—e.g., resources such as share-able frequencies), and then facilitate such a transaction. Server 32 of course, may execute the reverse—e.g., determine that satellite resources are available (e.g., from satellite gateway 26), determine whether to communicate with the cellular gateway 28, and then facilitate the transaction. For example, using a data link layer, cellular node 100, 102 may receive information from server 32 and schedule transmissions in time and frequency domains (including a mix of MF-TDMA, FDMA, CDMA, and/or OFDM schemes). And using a physical layer, cellular node 100, 102 may select specific power levels consistent with predetermined constraints stored at the server 32. In some instances, higher signal transmission power can be used—improving spectral efficiency of modulation schemes and thereby resulting in higher data rates. Networking across the physical layer (e.g., cellular nodes 100, 102 and server 12) can enable coordination diverse transports and respective platforms.

As described above, a location of terminal 12 may be fixed in some instances; however, in other instances, it may not be. When the terminal 12 is mobile, server 32 may need additional information to determine when it should transmit and/or receive data over a first LRWC mode versus a second LRWC mode. Further, a mobile terminal may require information regarding where to orient its respective antennas. FIG. 7 is a model that illustrates overlap between a management plane 300 and a control plane 400; this model is suitable for any communication platform of the above-described system 10 (e.g., platforms such as terminal 12, ng-eNB node 100, gNB node 102, and/or satellite gateway 26).

Management plane 300 comprises data collection 302, decision-making 304, dissemination 306, and resource exchange 308. Management plane 300 further may comprise a portion 310 for server 32 orchestration that includes: data collection 312, decision-making 314, dissemination 316, and resource exchange 318 and a frame level 320. The control plane 400 which overlaps the management plane 300 may comprise data collection 402, decision-making 404, dissemination 406, and resource exchange 408 and for a plurality of control iterations from 1 to $N_C$. As illustrated by 510, 520, and 530, orchestrator server 32 sends and/or receives information relative to 302-308, 312-318, and 402-408, respectively.

FIG. 7 further illustrates a Time Domain Multiple Access (TDMA) context (however, a CDMA, FDMA, etc. context could be used in other examples). For example, time parameters $T_M$, $T_C$, and $T_F$ may refer to a tier of three elements—the management plane ('M'), the control plane ('C'), and the data plane ('F'), respectively. As illustrated in the figure, the management plane may be the slowest, the control plane may be faster than the management plane, and the data plane may be faster than the control plane (e.g., $T_M > T_C > T_F$). A typical management plane cycle may comprise multiple control plane cycles—e.g., the control plane cycle for the cellular gateway 28 may be 20 ms (e.g., frame size), whereas the control plane cycle for the satellite gateway 26 may be 30 ms. In this example, server 32 could receive this information from each of the satellite and cellular gateways 26, 28 and determine that a synchronization setting of 60 ms (20 ms×30 ms) is feasible. This synchronization setting may be a lowest usable frame level (e.g., lowest common multiple). Further, $T_M$ may equal $N_C*T_C$, wherein $N_C$ is a number that determines a periodicity within which different tiers operate, $T_C$ is a lowest common multiple of a quantity of TDMA frame sizes. It should be appreciated that $N_C$ may be a relatively large number for management tier ($T_M$) and a relatively small number for data tier ($T_F$).

Server 32 can determine a terminal's (12) antenna directivity using a so-called two-line element (TLE) technique for a time-based estimate of terminal 12's position (and velocity, if terminal 12 is mobile).

Figure 8:
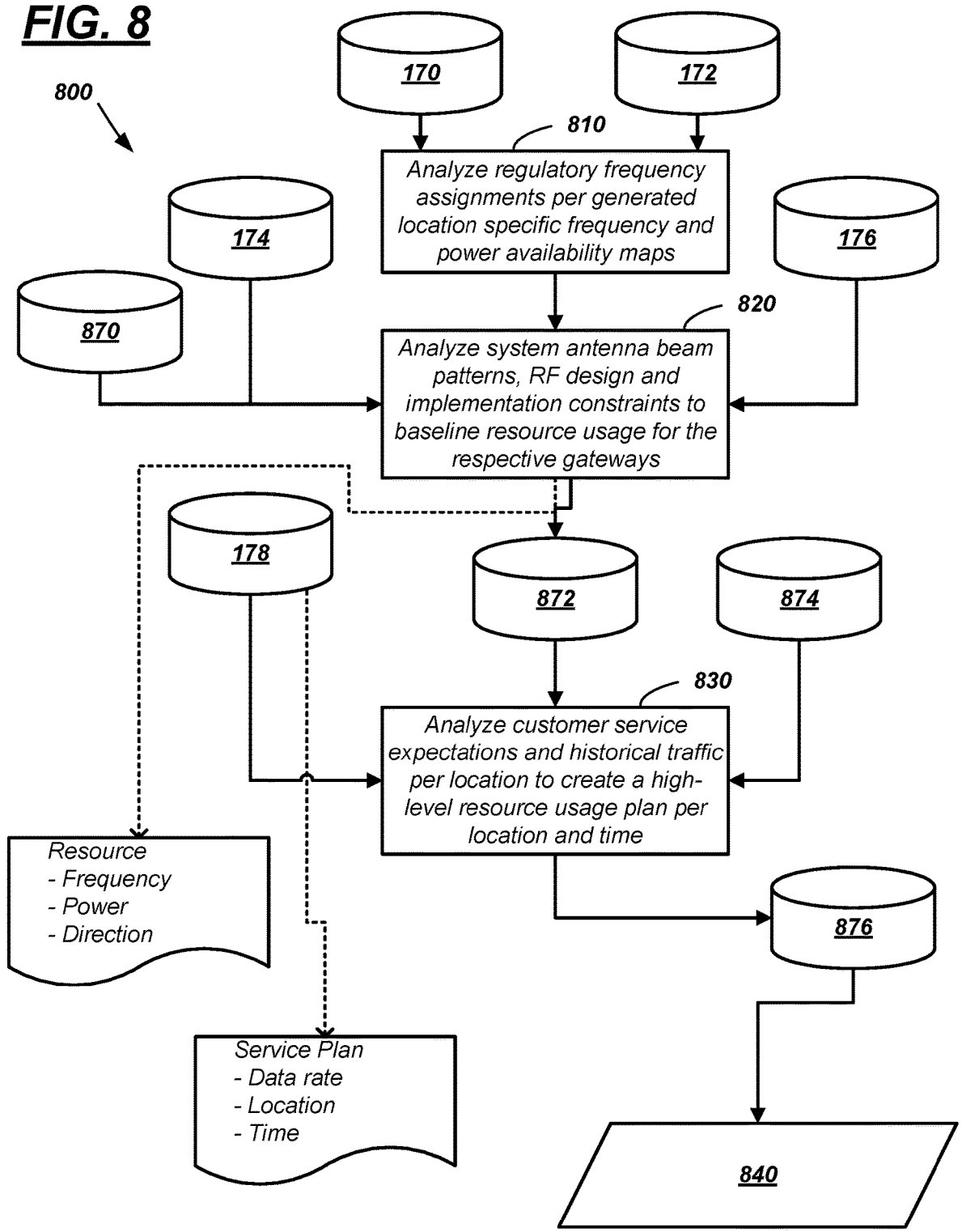
FIG. 8 is a flow diagram illustrating a process executable by a satellite or cellular gateway of the telecommunication system.

Turning to FIG. 8, a process 800 is illustrated that may be executed independently by each of satellite gateway 26 (e.g., via a so-called 'hub' thereof) and cellular gateway (e.g., cellular nodes 100, 102) thereby facilitating orchestration interaction between terminal 12, the satellite gateway 26, and/or the cellular node 100, 102. Before describing computer-executable instruction blocks 810, 820, 830, and 840, it will be appreciated that some previously-illustrated elements are shown (from FIG. 6), as well as some new elements (platform analytics data 870, expected resource usage data per location 872, historical traffic data 874, expected resource usage data per location and time 876, wherein examples of resources are frequency, power, and direction, wherein examples of service plan data are data rate, location of a platform, and time).

As either of satellite gateway 26 or cellular gateway 28 may execute the process 800, by way of example only, gateway 26 will be used to illustrate the process implementation (e.g., however, the same steps can be taken by cellular gateway 28 independent of and/or at least partially concurrently with those of satellite gateway 26). In block 810, satellite gateway 26 may analyze regulatory frequency assignments per generated location specific frequency and power availability maps. This may comprise receiving input from ITU regulation data 170 and host nation agreement data 172.

Following block 810, process 800 may proceed to block 820, wherein satellite gateway 26 may analyze system antenna beam patterns (from one or more terminals 12), RF design and implementation constraints to baseline resource usage for the system 10. This may include receiving input such as terminal antenna configuration data 174 (regarding terminal antennas 42), gateway antenna configuration data 176, and platform analytics data 870 (data analytics regarding terminals 12).

The output of block 820 may be used to determine expected resource usage data per location 872. And the output of block 872 may be provided to block 830.

In block 830, satellite gateway 26 may analyze customer service expectations and historical traffic per location to create a high-level resource usage plan per location and time. Thus, additional inputs to block 830 may comprise service plan data 178 and historical traffic data 874.

In block 876 which follows, satellite gateway 26 may determine expected resource usage data per location and time, and in block 840, this expected resource usage data per location and time may be transmitted to the orchestrator server 32 where it may be used by server 32 to instruct terminals 12 to selectively switch between satellite and cellular modes.

Figure 9:
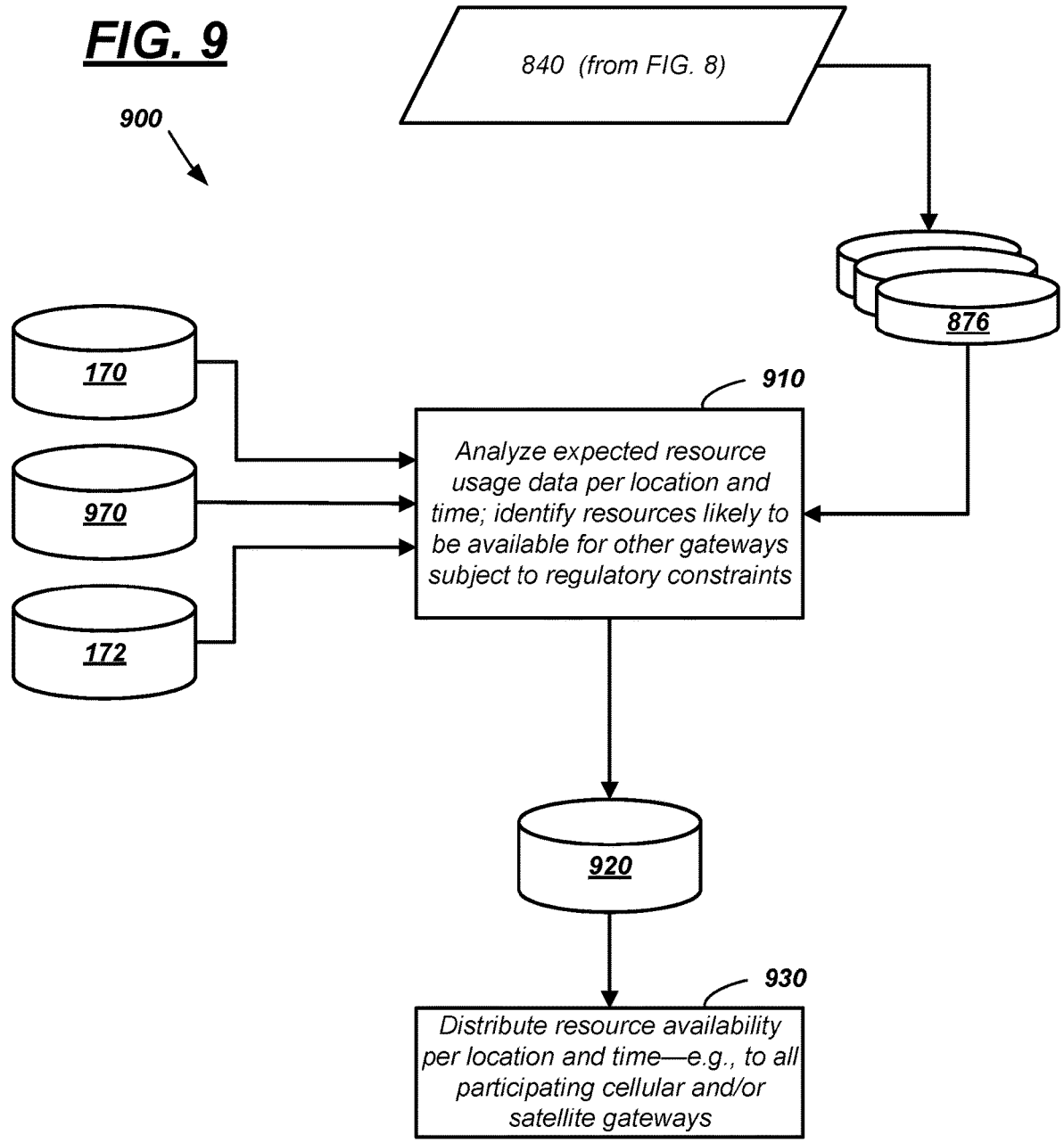
FIG. 9 is a flow diagram illustrating a process executable by the orchestrator server.

Turning now to FIG. 9, a process 900 executed by server 32 is illustrated—e.g., upon receipt of this expected resource usage data per location and time 876 from both satellite and cellular gateways 26, 28.

FIG. 9 illustrates server 32 receiving, from satellite and cellular gateways 26, 28, expected resource usage data per location and time 876 (via block 840) and aggregating and storing this data (e.g., in database 122). This expected resource usage data per location and time regarding multiple terminals 12 is used in block 910.

In block 910, server 32 analyzes expected resource usage data per location and time and identifies resources likely to be available for other gateways (e.g., analyzing expected usage resource data for either or both of satellite or cellular gateways 26, 28) subject to regulatory constraints. This includes receiving input from ITU regulation data 170, host nation agreement data 172, and historical resource availability data 970.

In block 920 which follows block 910, server 32 determines resource availability per location and time (e.g., for a plurality of terminals 12).

And in block 930 which follows, server 32 distributes resource availability data per location and time—e.g., to all participating satellite and/or cellular gateways 26, 28. Block 930 includes transmitting via any suitable mode this resource availability data (e.g., via cellular mode, via satellite mode, or the like).

Figure 10:
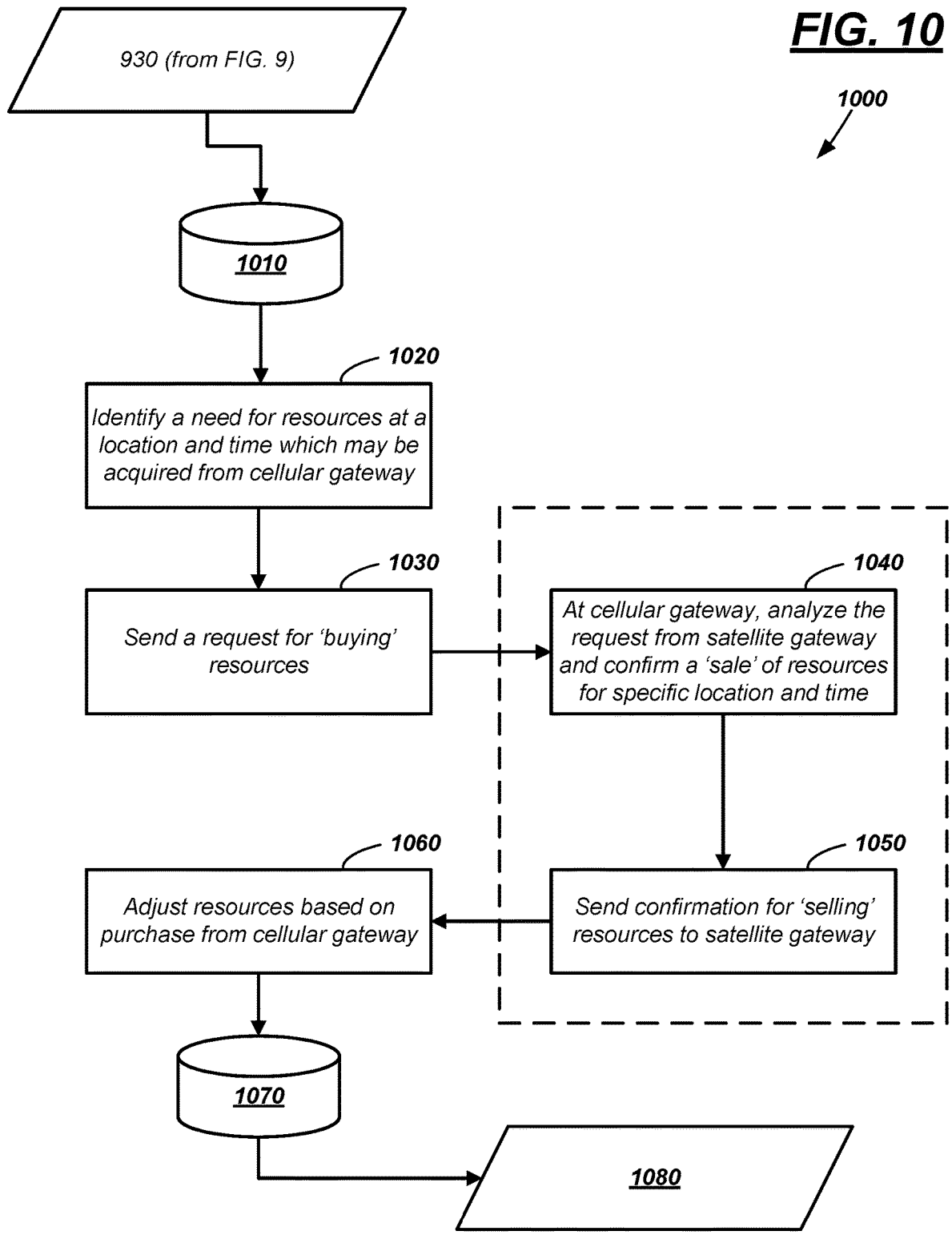
FIG. 10 is a flow diagram which may be executed between a satellite or cellular gateway of the telecommunication system

Turning now to FIG. 10, a process 1000 is shown which may be executed between the satellite gateway 26 and the cellular gateway 28 via the management plane 300, control plane 400, and a data plane. Process 1000 may facilitate further resource sharing. In process 1000, the satellite gateway 26 is illustrated as requesting resources (e.g., one or more frequencies at a predetermined time or for a predetermined duration) from cellular gateway 28; however, it should be appreciated that in other examples, cellular gateway 28 could request resources from satellite gateway 26 instead.

Block 1010 includes satellite gateway 26 determining its own resource availability per location and time. Input to this block includes data from block 930 (of FIG. 9).

Block 1020 which follows includes satellite gateway 26 determining a need for resources at a specific location and time, wherein gateway 26 may be able to acquire such resources from cellular gateway 28.

In block 1030 which follows, satellite gateway 26 sends a request cellular gateway 28 for 'buying' resources therefrom. The terms 'buy' and 'sell' refer to the satellite and cellular gateways 26, 28 using a secure transaction technique to exchange information regarding resources—e.g., a blockchain or other suitable technology.

Blocks 1040 and 1050 may occur at the cellular gateway 28. In block 1040, the cellular gateway 28 may analyze the request from the satellite gateway 26 and confirm a 'sale' of resources for a specific location and time.

In block 1050 which follows, the cellular gateway 28 may send a confirmation for 'selling' resources to satellite gateway 26.

In block 1060 which follows, satellite gateway 26 re-determines its resources based on the acquisition from the cellular gateway 28, and in block 1070, the satellite gateway 26 stores updated resource usage data per location and time in memory.

And in block 1080 which follows, satellite gateway 26 updates (in computer 80) its resource usage data per location and time. Of course, were the process 1000 illustrated with respect to the cellular gateway 28 being the recipient, the cellular gateway 28 would update this information instead.

Figure 11:
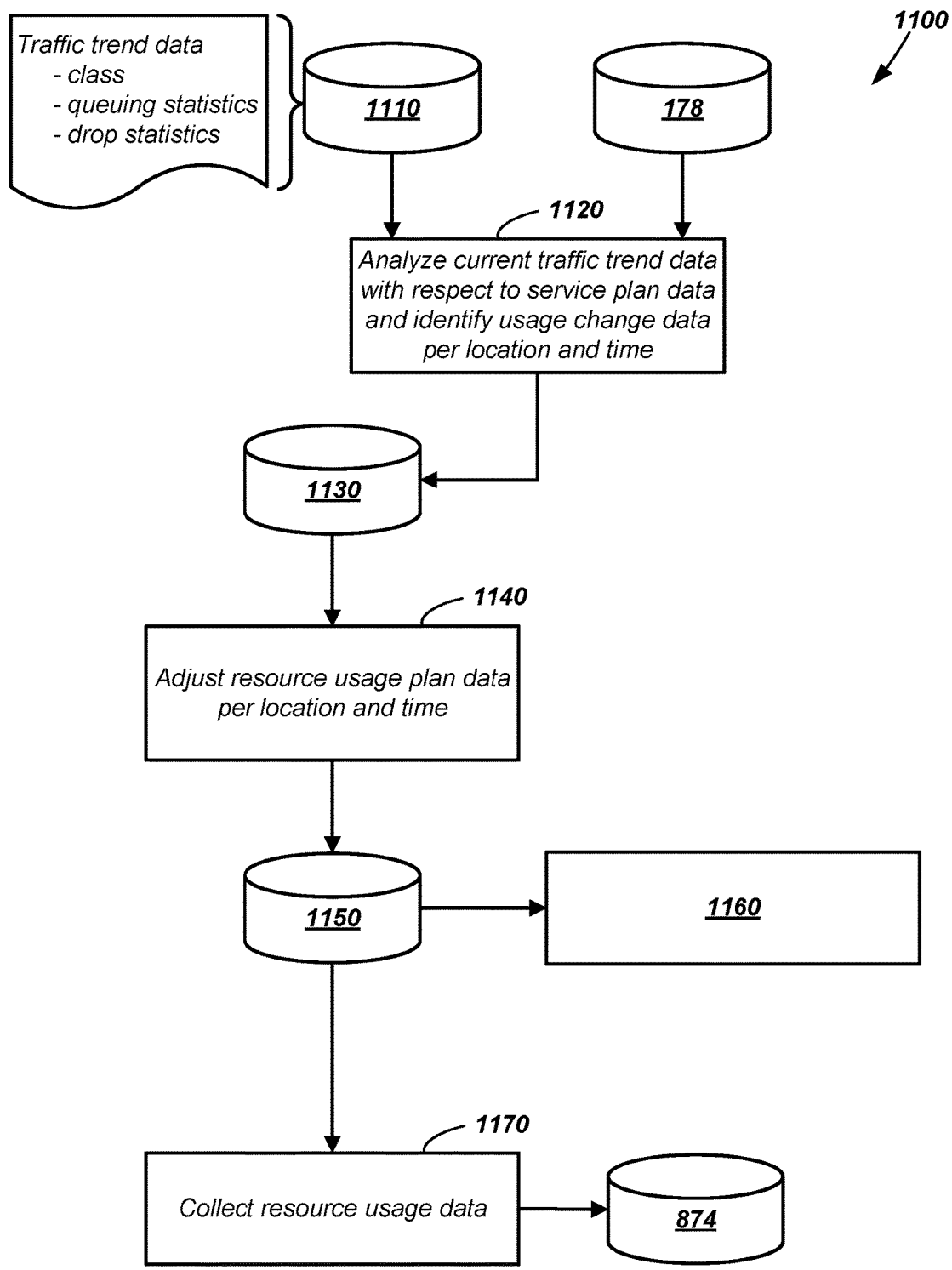
FIG. 11 is a flow diagram of a process for operating a control plane of a satellite or cellular gateway of the telecommunication system.

Turning to FIG. 11, a schematic diagram of a process 1100 for operating control plane 400 of satellite and cellular gateways 26, 28 is illustrated. As process 1100 may be similar for either gateway, process 1100 will be described with respect to only one (satellite gateway 26).

The process may begin by traffic trend data 1110 and service plan data 178 being utilized in block 1120. In block 1120, control plane 400 of satellite gateway 26 may analyze current traffic trend data 1410 with respect to service plan data 178 and identify usage change data per location and time.

Thereafter, in block 1130, satellite gateway 26 may determine and store incremental resource usage change data per location and time.

Following this, in block 1140, satellite gateway 26 may adjust resource usage plan data per location and time.

In block 1150 which follows, satellite gateway 26 may determine resource usage data per location and time with a probability greater than a threshold.

In block 1160, satellite gateway 26 may send the determined resource usage data per location and time (of block 1150) to the server 32.

And also following block 1150, satellite gateway 26 may collect resource usage data. At least some of this collected data may be used to update historical traffic data 874.

Figure 12:
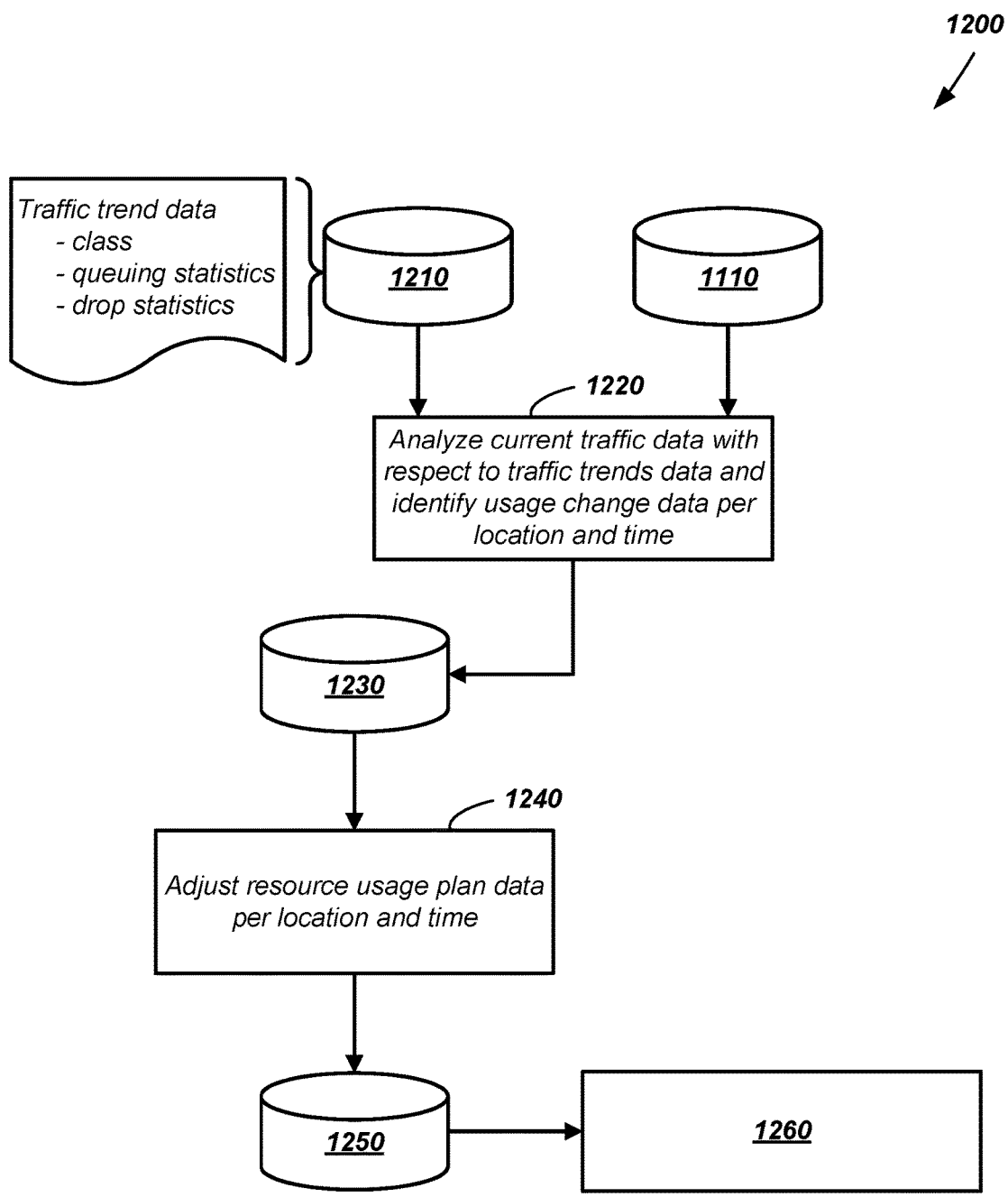
FIG. 12 is a flow diagram of a process for operating a data plane of a satellite or cellular gateway of the telecommunication system.

Turning to FIG. 12, a schematic diagram of a process 1200 for operating a data plane of satellite and cellular gateways 26, 28 is illustrated. As process 1200 may be similar for either gateway, process 1200 will be described with respect to only one (satellite gateway 26).

The process may begin by current traffic data 1210 and traffic trend data 1110 being utilized in block 1220. In block 1220, the data plane of satellite gateway 26 may analyze current traffic data 1210 with respect to traffic trend data 1110 and identify usage change data per location and time.

Thereafter, in block 1230, satellite gateway 26 may determine and store incremental resource usage change data per location and time.

Following this, in block 1240, satellite gateway 26 may adjust resource usage plan data per location and time.

In block 1250 which follows, satellite gateway 26 may determine resource usage data per location and time.

Thereafter, in block 1260, satellite gateway 26 may send the determined resource usage data per location and time to the server 32.

Figure 13:
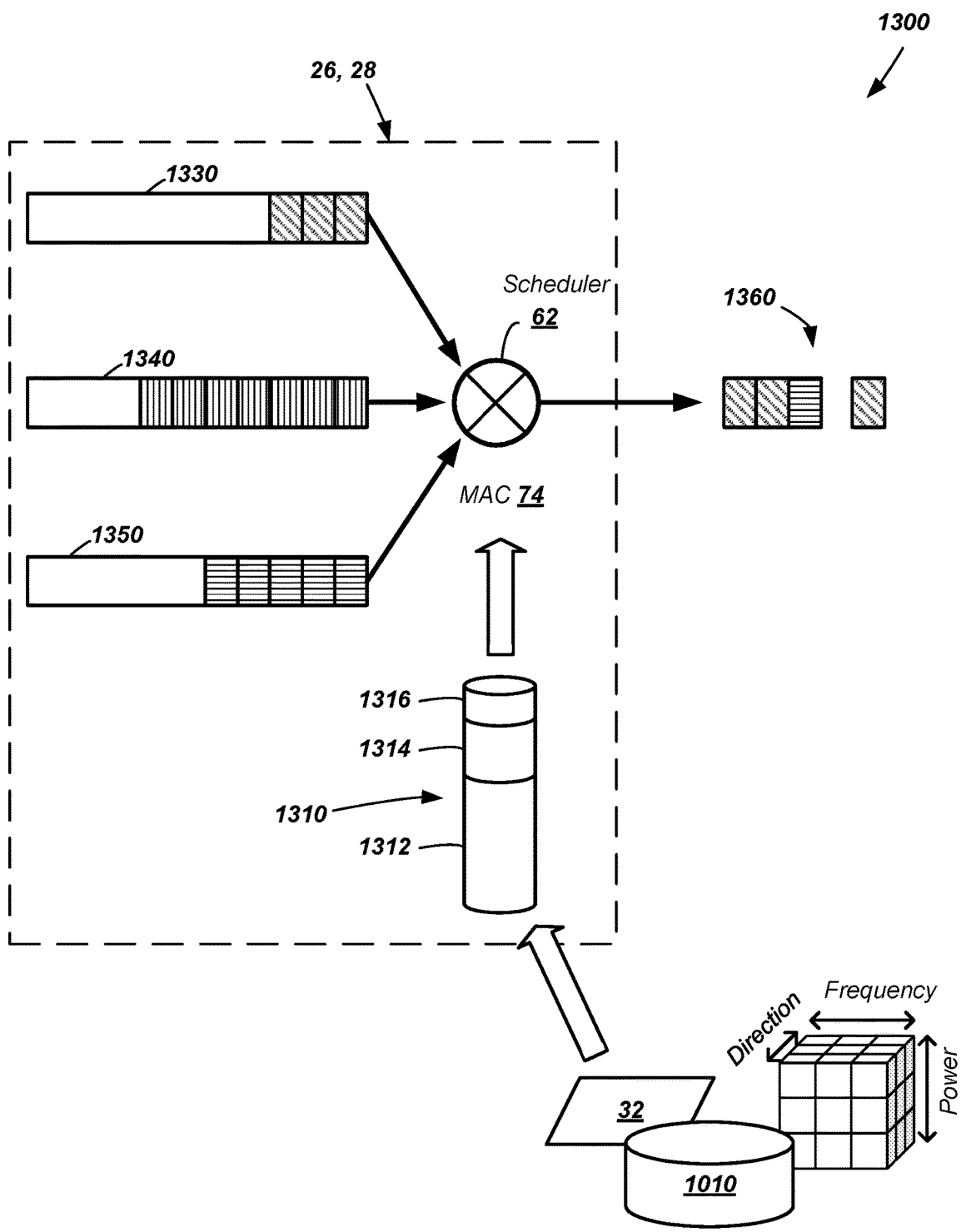
FIG. 13 is a schematic diagram illustrating use of a MAC layer of a satellite or cellular gateway of the telecommunication system.

Turning now to FIG. 13, a MAC (or data link) layer coordination is illustrated, wherein, at the MAC layer, resource sharing utilizes dynamic frequency, time, and power availability information to coordinate waveform specific multi-access schemes. Again, the server 32 can maintain a large multi-dimensional and geographic database that efficiently stores indexed data related to regulatory constraints, locations of satellite gateways 26, satellites 18-24 and cellular nodes 100, 102, locations and trajectories of terminals 12 and/or satellites 18-24, and the relationship between the terminals 12 and the gateways 26 and nodes 100, 102. For example, FIG. 13 illustrates server 32, resource availability data 1010 (per location, time, and system), and information regarding signal direction, signal frequency, and signal power all being inputs to a resource pool 1310 of satellite gateway 26 and/or cellular gateway 28. The pool 1310 can comprise management plane baseline data 1312, mid-term adjustment data 1314, and frame-level refinement data 1316—e.g., all of which may be input to respective MAC layer 74 of gateway 26, 28. As shown, the MAC layer 74 (of either gateway 26, 28) may comprise a scheduler, and the scheduler thus may receive data from multiple traffic queues (e.g., such as queues 1330, 1340, 1350) and efficiently output 1660 a transmission that comprises data from the queues 1330, 1340, 1350 according to a predetermined schedule.

Figure 14:
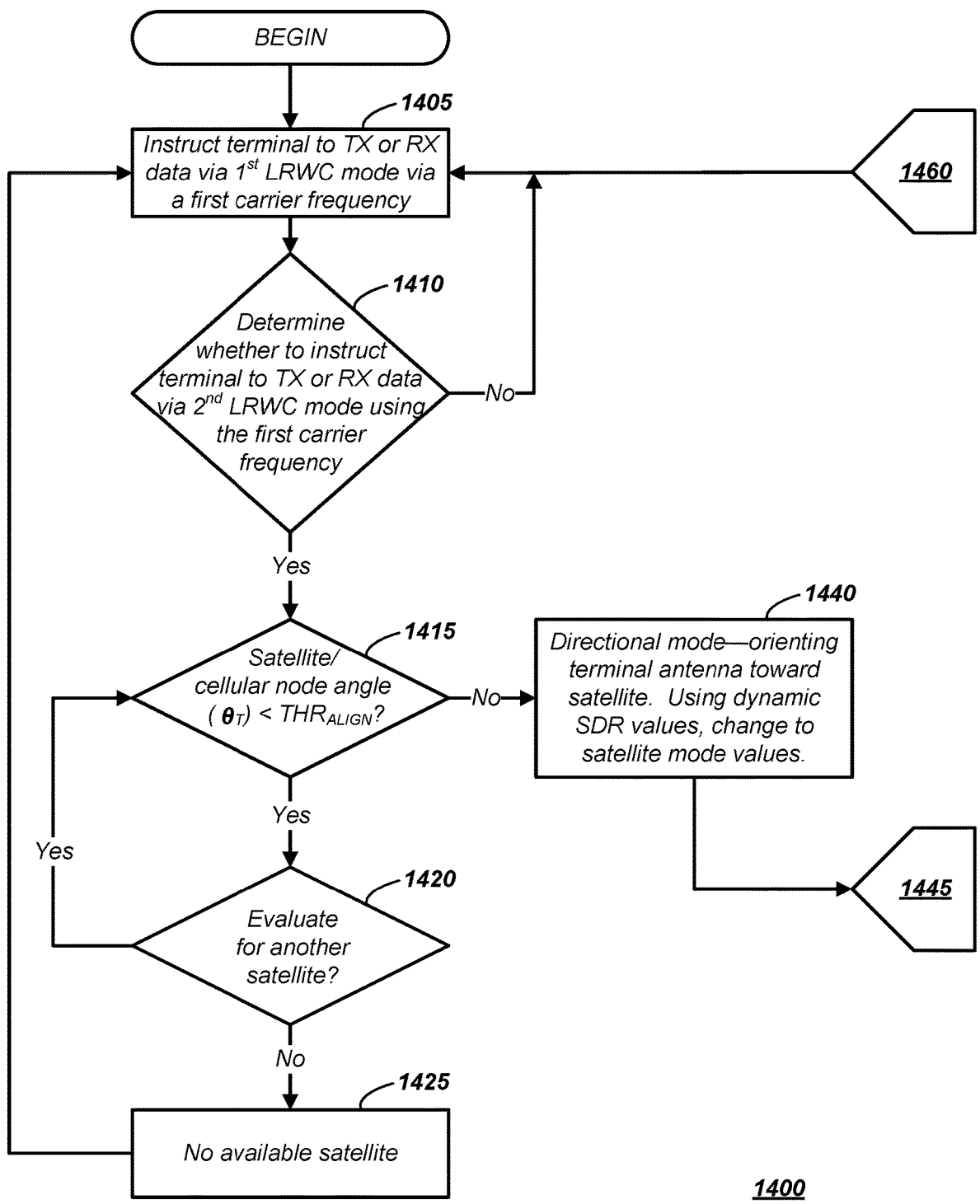
FIGS. 14-15 illustrate a flowchart of a process executable by the orchestrator server.
Figure 15:
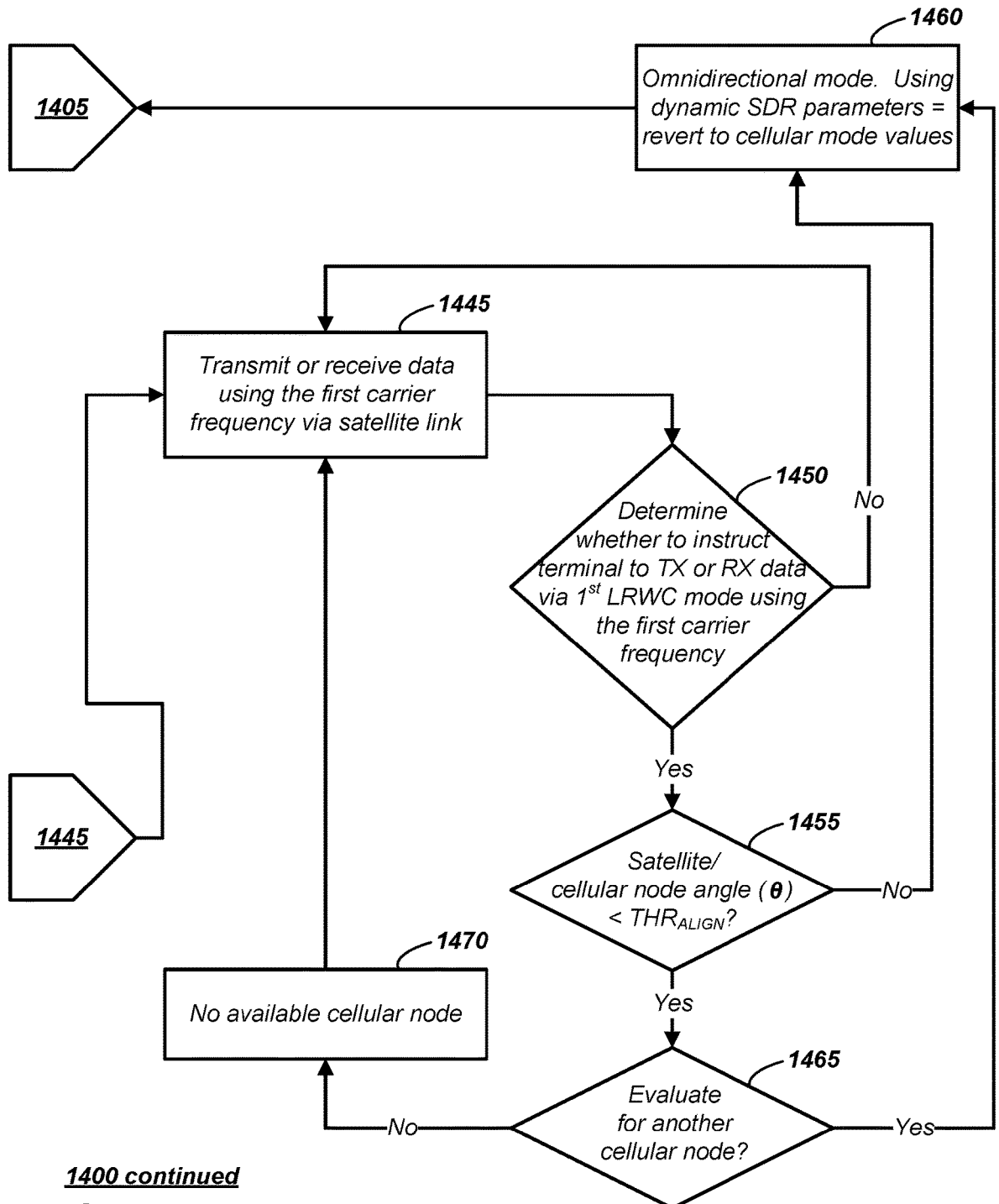

Now turning to FIGS. 14-15, a process 1400 is shown illustrating how orchestrator server 32 may control terminal 12 to switch selectively back-and-forth between a first long-range wireless communication (LRWC) mode and a second LRWC mode. For purposes of illustration only (in FIGS. 14-15), the first LRWC mode will be described as a cellular mode, and the second LRWC mode will be described as a satellite mode; however, it should be appreciated that (in other examples) the first LRWC mode could be a satellite or other mode, and the second LRWC mode could be a cellular or other mode. Further, process 1400 could utilize a third LRWC mode, a fourth LRWC, etc., as well. The process 1400 illustrates some of the instructions which may be stored in memory 126 and which may be executable by processor 124 (of the server 32).

Process 1400 begins with block 1405 wherein server 32 instructs terminal 12 to transmit or receive data via the first LRWC (cellular) mode via a first carrier frequency—e.g., having an established cellular link between it and gNB node 102 (of course, in other examples, the cellular link could be between terminal 12 and ng-eNB node 100 instead). In the cellular mode, the terminal 12 may control antenna 42 to be in an omnidirectional mode (as described above). Further, the cellular mode values of at least some of the dynamic parameters discussed above may be used.

In block 1410, server 32 may determine whether to instruct terminal 12 (e.g., via a cellular link) to transmit or receive data via a second LRWC (satellite) mode using the same first carrier frequency. For example, based on increased network traffic over the first LRWC and decreased network traffic over the second LRWC, server 32 may consider terminal 12 to be a candidate for switching between the first and second LRWC modes. If so, process 1400 proceeds to block 1415; else, process 1400 loops back and repeats block 1405.

In block 1415, server 32 may evaluate one or more conditions regarding terminal 12. For example, server 32 may determine whether the radio frequency interference (RFI) is suitable for such a radio link connection (e.g., suitable for terminal 12 to communicate via the requested satellite mode). According to one example, the interference may be suitable for such communication provided that— from the point of view of terminal 12—a subtended angle between satellite 18 and the gNB node 102 is greater than or equal to a threshold alignment (THR$_{ALIGN}$). If the RFI is not suitable for switching to the satellite mode, then process 1400 proceeds to block 1420; else, if the RFI is suitable for switching to the satellite mode, then process 1400 proceeds to block 1440. Server 32 is suitably situated to receive information regarding the positions of satellites 18, terminal 12, nearby cellular nodes 100, 102, etc. Accordingly, using Euclidean geometry, server 32 may calculate such a subtended angle and determine whether the angle is less than the predetermined threshold alignment (THR$_{ALIGN}$).

Figure 16:
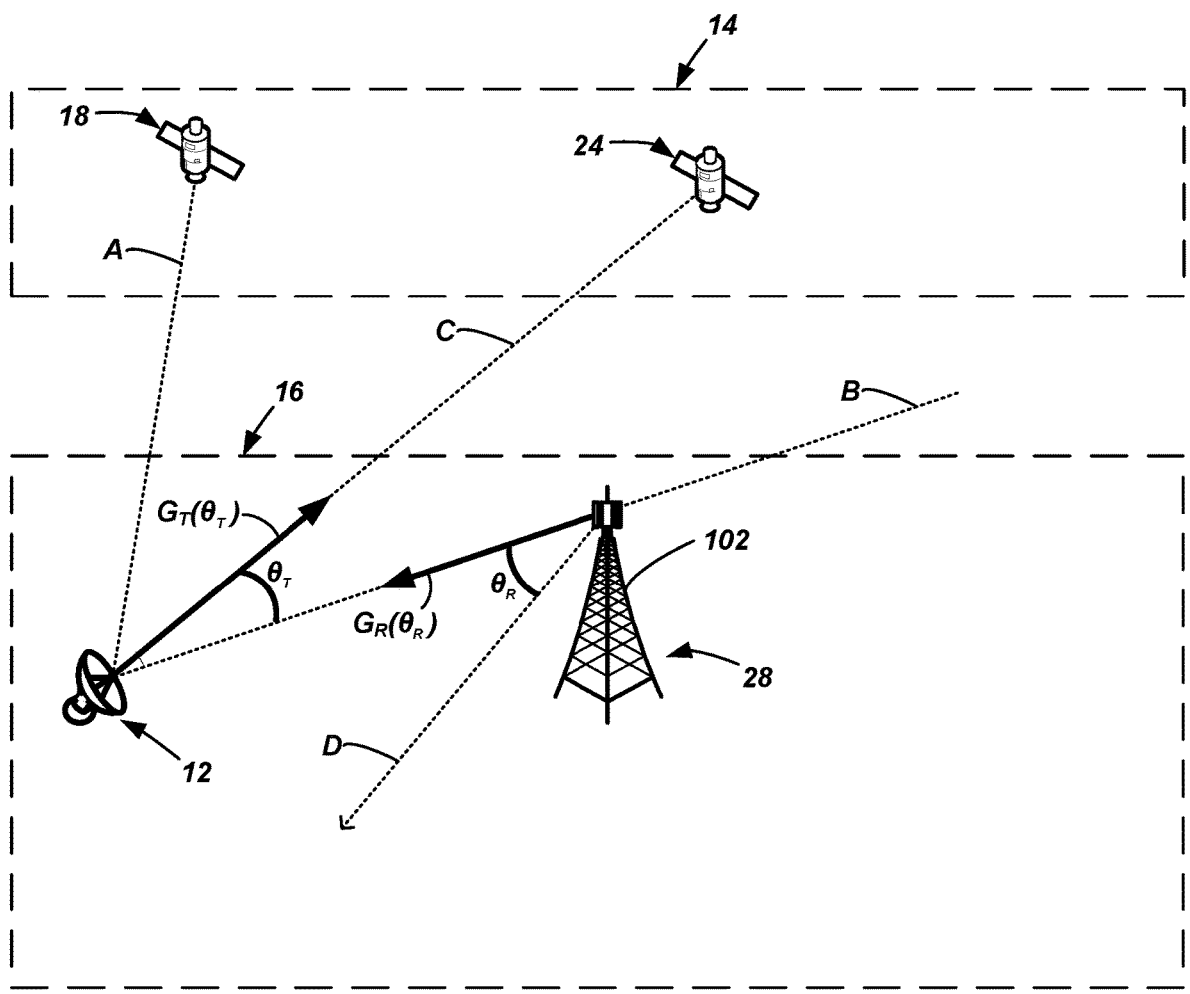
FIG. 16 is a schematic diagram illustrating a determination of a threshold alignment.

FIG. 16 is a diagram to illustrate determining the threshold alignment (THR$_{ALIGN}$). More particularly, FIG. 16 illustrates terminal 12, satellite 18, and gNB node 102. Further, the figure illustrates a first axis A (extending between terminal 12 and satellite 18), a second axis B (extending between terminal 12 and gNB node 102), a third axis C (extending between terminal 12 and satellite 24), and a fourth axis D (extending between gNB node 102 and a major axis of a radio link transmission (e.g., a major axis of a lobe (not shown))). Terminal 12 may determine an angle $\theta_T$ between the axes B, C (e.g., using received signal strength indicator (RSSI) data, time-of-flight (TOF) data, angle-of-arrival (AoA) data, and/or other techniques including those discussed above (e.g., a two-line element (TLE) technique)). If the value of angle $\theta_T$ is less than THR$_{ALIGN}$, then computer 120 may determine to proceed to block 1420. Else, computer 120 may determine to proceed to block 1440.

According to one non-limiting example, threshold alignment (THR$_{ALIGN}$) is 2 degrees) (°). Before discussing blocks 1420 and 1440, an exemplary derivation of the interference (RFI) is disclosed. Empirically, the RFI is suitable for dynamically switching between the first and second LWRC modes when the angle $\theta_T$ is less than the threshold alignment (THR$_{ALIGN}$). For example, the value of the threshold alignment (THR$_{ALIGN}$) may be based on factors such as receiving antenna gain, transmitting antenna gain, and interference, as discussed below and shown in Equation (1).

$$RFI=P_T+G_R(\theta_R)+G_T(\theta_T)-SF_L(\text{in dB}), \quad \text{Equation (1)}.$$

wherein RFI is interference, $P_T$ is transmit power of a radio link, $G_R$ ($\theta_R$) is a receiving antenna gain, $G_T(\theta_T)$ is a transmitting antenna gain, and $SF_L$ is a free space loss. $G_T$( ) is a function of $\theta_T$, wherein $\theta_T$ is an angle between an interfering antenna and a receiving antenna boresight. And $G_R$( ) is a function of $\theta_R$, wherein $\theta_R$ is a direction of an interfering link with respect to terminal 12.

Assuming, e.g., server 32 is determining whether the threshold alignment of terminal 12 is suitable for transmitting data to satellite 24, $P_T$ may be the transmit power of a radio link from terminal 12 to satellite 24 along axis C. $G_T$ ($\theta_T$) may be a transmitting antenna gain of terminal 12, wherein $\theta_T$ is the angular measure between an interfering antenna (of gNB node 102) and the receiving antenna boresight of satellite 24 (e.g., along axis C).

Returning to FIG. 14, recall the process 1400 proceeds to block 1420 when angle $\theta_T$ is less than the threshold alignment (THR$_{ALIGN}$); i.e., server 32 determines the RFI to be too excessive. In block 1420, server 32 may determine whether another satellite is available (e.g., determining that satellite 18 may be used). If not, server 32 proceeds to block 1425. If another satellite is available, then process 1400 may loop back and repeat block 1415 (e.g., determining an angle between axis A and axis B. Block 1420 is optional and may not be included in all examples.

In block 1425, if no satellite is available (at an angle greater than or equal to the threshold alignment (THR$_{ALIGN}$) with respect to gNB 102), then server 32 determines a state of "no satellite is available." Thereafter, the process may loop back to block 1405—permitting terminal 12 to continue to transmit or receive via the cellular mode.

Returning to block 1440—which may follow block 1415, server 32 may instruct terminal 12 to change LRWC modes—e.g., from the cellular mode to the satellite mode. In one example, the instruction also may specify a satellite selection (e.g., satellite 24). The instructions further may comprise server 32 commanding terminal 12 to control a directionality of its antenna 42—e.g., beamforming in the direction (along a boresight of) the satellite 24 (e.g., along axis C). Block 1440 further may comprise server 32 instructing terminal 12 to use a different set of dynamic parameters. Accordingly, terminal 12 may receive these dynamic parameters and update its SDR, thereby permitting the terminal 12 to operate in the second LRWC mode (satellite) while using the same frequency used in the first LRWC mode.

Following block 1440, the process 1400 may proceed to block 1445 (shown on FIG. 15). In block 1445, terminal 12 may transmit or receive data using the first carrier frequency, but via a satellite link.

Block 1450 follows. In block 1450, server 32 may determine whether to instruct terminal 12 to again transmit or receive data via the first LWRC mode. In some cases, this determination again may include terminal 12 using the first carrier frequency. If server 32 determines not to so instruct terminal 12, then process 1440 may loop back and continue to execute block 1445. However, if server 32 so determines, then process 1400 may proceed to block 1455.

In block 1455, server 32 may determine whether the radio frequency interference (RFI) is suitable for such a radio link connection (e.g., suitable for terminal 12 to communicate via the requested cellular mode). In general, block 1455 may be identical or similar to the instructions of block 1415; therefore, this will not be described in detail here. If the RFI is not suitable for switching to the cellular mode (and using the same first carrier frequency), then process 1400 may proceed to block 1465; else, if the RFI is suitable for switching to the cellular mode (and using the same first carrier frequency), then process 1400 proceeds to block 1460.

In block 1460, the computer 120 instructs terminal 12 to change to the first LRWC mode. For example, as before, this may include identifying a satellite, commanding the terminal 12 to control antenna directionality, providing terminal 12 dynamic parameters, and the like. Accordingly, terminal 12 may revert antenna 42 to the omnidirectional mode, etc. Thereafter, server 32 again proceeds to block 1405 (FIG. 14), and terminal 12 may communicate via the cellular mode.

In block 1465 which may follow block 1455, server 32 may evaluate for another cellular node (e.g., another gNB node 102 or a ng-eNB node 100). If a suitable cellular node is discovered, then process 1400 may proceed to block 1460, as described above. If not, the process may proceed to block 1470.

In block 1470, server 32 may determine that a state of terminal 12 is "no available cellular node." Thereafter, process 1400 may loop back to and repeat block 1445.

It should be appreciated that regarding process 1400—in some examples terminal 12 may be fixed (e.g., to a building or other structure); however, this is not required (e.g., terminal 12 may be mobile). Further, it should be appreciated that in some examples, satellites 18, 24 may be relatively fixed—with respect to terminal 12—in the sky as well (e.g., a GEO satellite and a fixed terminal 12). However, in other examples, satellites 18 and/or 24 may be otherwise GSO or NGSO. In these latter instances, (from the point of view of the terminal 12) a subtended angle between the satellite 18, 24 and cellular node 102 (respectively) sometimes may be less than the threshold alignment (THR$_{ALIGN}$) and sometimes may be greater than or equal to the threshold alignment (THR$_{ALIGN}$), as the satellites 18, 24 could be moving (e.g., with respect to earth). A similar set of circumstances can exist with a fixed position satellite and a moving terminal—or with both a moving satellite and a moving terminal.

According to one aspect of process 1400, the process may utilize satellite communication latency. For example, there is a significant difference in propagation delay (satellite communication latency)—e.g., between satellite communication and terrestrial (e.g., cellular) communication (e.g., a time between scheduling and transmission toward satellite 18, 24 from satellite gateway 26 and a time the signal is received at terminal 12 may be approximately 240 milliseconds). In some examples, server 32 can communicate this satellite communication latency to a cellular node (e.g., ng-eNB 100 and/or gNB 102). Further, concurrent with (or even after) transmitting a satellite uplink from gateway 26, gateway 26 may inform cellular nodes 100, 102 (via a cellular link) of forthcoming satellite link data. Forthcoming satellite link data, as used herein, refers to data pertaining to satellite link parameters that is communicated via a cellular link; examples of forthcoming satellite link data include: satellite link waveform data, satellite link power level data (e.g., expected or estimated by calculation), and satellite link timing data (time of arrival, duration, etc.). Accordingly, the respective cellular node 100, 102 may communicate this with terminal 12—enabling it to switch from the cellular mode to the satellite mode at a predetermined, appropriate timing.

Thus, in consideration of the exemplary propagation delays discussed above, the delay difference between satellite system and terrestrial systems permits server 32 to utilize the cellular AN 28 (e.g., one of nodes 100, 102) to communicate with and thereby prepare terminal 12 to switch between the first and second LRWC modes—e.g., even if the message sent via cellular mode is transmitted after the data being transmitted via satellite mode.

The description above refers to an exemplary terminal (e.g., 12), wherein terminal 12 is representative of potentially countless numbers of similar or identical such terminals. Further, other terminals may be configured differently from terminal 12 and may be utilizing either a cellular link or a satellite link. Accordingly, it should be appreciated that numerous satellite links and numerous cellular links may be occurring concurrently. As used herein, satellite traffic refers to a quantity of data being communicated by a satellite link over a predefined quantity of time, and as used herein, cellular traffic refers to a quantity of data being communicated via one or more cellular nodes over a predefined quantity of time. Using the telecommunication system 10 described above, satellite and cellular traffic can be balanced to improve an overall communication efficiency of the system (e.g., when satellite traffic is low and cellular traffic is high, orchestrator server 32 may shift some of the cellular links of terminals 12 to satellite links thereby improving overall throughput and efficiency; or e.g., when satellite traffic is high and cellular traffic is low, orchestrator server 32 may shift some of the satellite links of terminals 12 to cellular links similarly improving overall throughput and efficiency).

Thus, there has been described an orchestrator server that can help facilitate the multi-mode functionality of a terminal that can switch between a first long-range wireless communication (LRWC) mode and a second LRWC mode.

Figure 17:
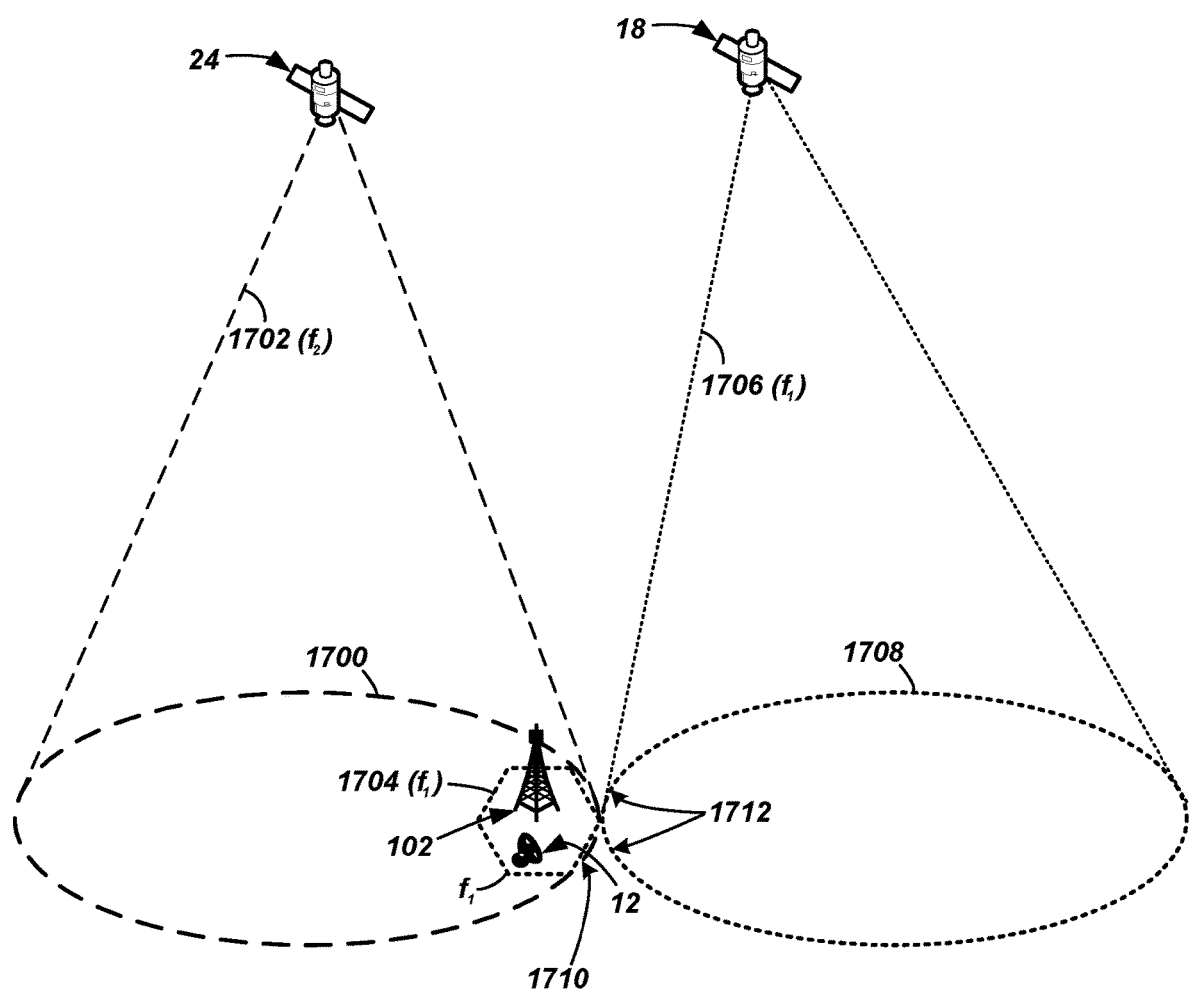
FIG. 17 is an example of the orchestrator server using interference from another satellite beam to improve communications.

Other embodiments of system 10 also exist. For example, FIG. 17 illustrates another embodiment of the telecommunication system 10 described above, wherein expected (e.g., estimated) interference at terminal 12 and/or at cellular node (e.g., 100, 102) may be used by server 32 to improve performance in a terrestrial cell. For example, FIG. 17 illustrates an example of terminal 12 being located within a satellite coverage area 1700 of a beam 1702 (the satellite beam comprising a frequency $f_2$) and also located within a cellular coverage area 1704 (the cellular node 102 utilizing a frequency $f_1$). FIG. 17 further illustrates a neighboring satellite beam 1706 (the satellite beam comprising the frequency $f_1$) projecting a satellite coverage area 1708. As the cellular coverage area 1704 may be near a fringe region 1710 of coverage area 1700 and near a fringe region 1712 of coverage area 1708—and as beam 1706 and node 102 may communicate using the same frequency ($f_1$), the node 102 and/or the terminal 12 may experience higher than typical interference. According to one example, the information carried by beam 1706 can be used by cellular node 102 to improve the performance at the terminal 12. For example, server 32 can instruct the cellular node 102 to modify its transmission waveform so that when the cellular transmission is added to the expected interference at terminal 12, this cellular transmission will cancel the expected interference.

In general, the computing systems and/or devices described may employ any of a number of computer operating systems, including, but by no means limited to, versions and/or varieties of Hughes proprietary operating and software systems, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing inroute and outroute communications between a gateway computer and a plurality of terminals.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising:
a terminal, comprising:
a processor;
memory, coupled to the processor, storing instructions executable by the processor; and
an antenna,
wherein the instructions comprise, to:
using a first long-range wireless communication (LRWC) mode, receive or transmit first wireless data using a carrier frequency;
use a first set of dynamic parameters in the first LRWC mode;
receive a command to use a second LRWC mode;
using the second LRWC, receive or transmit second wireless data using the same carrier frequency; and
use a second set of dynamic parameters in the second LRWC mode, wherein the first set comprises at least one dynamic parameter that is different from each dynamic parameter in the second set,
wherein the first LRWC mode is different than the second LRWC mode.

2. The system of claim 1, wherein the command is received from an orchestrator server.

3. The system of claim 1, wherein the instructions further comprise: to control a directionality of the antenna when switching between the first and second LRWC modes.

4. The system of claim 1, wherein the terminal further comprises a software stack that enables the terminal to operate as a software defined radio (SDR).

5. The system of claim 1, wherein the first LRWC mode is a satellite mode, wherein the second LRWC mode is a cellular mode.

6. The system of claim 1, further comprising an orchestrator server that commands the terminal and a plurality of other terminals to selectively switch between the first and second LRWC modes.

7. A system, comprising:
an orchestrator server, comprising:
  a computer communicatively coupled to a satellite gateway and a cellular access network, the computer comprising:
    a processor; and
    memory, coupled to the processor, storing instructions executable by the processor, the instructions comprising, to:
      instruct a first terminal to communicate wirelessly via a carrier frequency using a first long-range wireless communication (LRWC) mode;
      determine that, relative to the first terminal, a subtended angle between a satellite and a cellular node is less than an alignment threshold; and
      based on the determination, transmit a command to the first terminal to communicate wirelessly via the carrier frequency using a second LRWC mode, wherein the first LRWC mode is different than that the second LRWC mode.

8. The system of claim 7, wherein the alignment threshold is two degrees.

9. The system of claim 7, wherein the command further comprises a second set of dynamic parameters, for operation of the first terminal in the second LRWC mode, wherein the second set is different than a first set of dynamic parameters being used by the first terminal at a time of the command.

10. The system of claim 7, wherein the first LRWC mode is a satellite mode, wherein the second LRWC mode is a cellular mode.

11. The system of claim 7, further comprising the first terminal, wherein the first terminal is programmed to transmit or receive first wireless data via the first LRWC mode using the carrier frequency and also to transmit or receive second wireless data via the second LRWC mode using the carrier frequency.

12. The system of claim 7, wherein the instructions further comprise: repeating the instructions to instruct, determine, and transmit for a plurality of terminals, wherein the plurality of terminals includes the first terminal.

13. The system of claim 12, wherein the instructions further comprise: transmitting the commands to each of the plurality of terminals based on availability of a plurality of system resources, wherein the plurality of system resources includes one or more satellites, one or more cellular nodes of the cellular access network, and the satellite gateway.

14. The system of claim 12, wherein the instructions further comprise: commanding at least some of the plurality of terminals to switch between the first and second LRWC modes based on current wireless traffic data, wireless traffic trend data, or both.

15. The system of claim 12, wherein the instructions further comprise: negotiating with a second orchestrator server to exchange system resources using a secure transaction technique.

16. A method of controlling terminal communication, comprising:
  instructing a first terminal to communicate wirelessly via a carrier frequency using a first long-range wireless communication (LRWC) mode;
  determining that, relative to the first terminal, a subtended angle between a satellite and a cellular node is less than an alignment threshold; and
  based on the determination, transmitting a command to the first terminal to communicate wirelessly via the carrier frequency using a second LRWC mode,
  wherein the first LRWC mode is different than that the second LRWC mode.

17. The method of claim 16, wherein the alignment threshold is two degrees.

18. The method of claim 16, further comprising: repeating the instructing, determining, and transmitting for a plurality of terminals, wherein the plurality of terminals includes the first terminal; and transmitting the commands to each of the plurality of terminals based on availability of a plurality of system resources, wherein the plurality of system resources includes one or more satellites, one or more cellular nodes of the cellular access network, and the satellite gateway.

* * * * *